US012366335B2

(12) United States Patent
Yang

(10) Patent No.: US 12,366,335 B2
(45) Date of Patent: Jul. 22, 2025

(54) QUICK LINK LIGHT, DRIVING DEVICE, AND SYSTEM

(71) Applicant: Shenzhen Ephan Technology Co., Ltd, Shenzhen (CN)

(72) Inventor: Xiangdong Yang, Shenzhen (CN)

(73) Assignee: Shenzhen Ephan Technology Co., Ltd, Shenzhen (CN)

( * ) Notice: Subject to any disclaimer, the term of this patent is extended or adjusted under 35 U.S.C. 154(b) by 0 days.

(21) Appl. No.: 18/989,451

(22) Filed: Dec. 20, 2024

(65) Prior Publication Data

US 2025/0122984 A1 Apr. 17, 2025

(30) Foreign Application Priority Data

Nov. 19, 2024 (CN) ......................... 202411649629.9

(51) Int. Cl.

| | |
|---|---|
| ***F21S 2/00*** | (2016.01) |
| ***F21V 23/00*** | (2015.01) |
| ***F21V 23/02*** | (2006.01) |
| ***F21V 23/04*** | (2006.01) |
| ***F21V 23/06*** | (2006.01) |
| ***H05B 45/10*** | (2020.01) |
| ***H05B 45/20*** | (2020.01) |
| ***H05B 45/325*** | (2020.01) |
| ***H05B 47/195*** | (2020.01) |
| *F21Y 115/10* | (2016.01) |

(52) U.S. Cl.

CPC ............ *F21S 2/005* (2013.01); *F21V 23/001* (2013.01); *F21V 23/008* (2013.01); *F21V 23/02* (2013.01); *F21V 23/0435* (2013.01); *F21V 23/06* (2013.01); *H05B 45/10* (2020.01); *H05B 45/20* (2020.01); *H05B 45/325* (2020.01); *H05B 47/195* (2020.01); *F21Y 2115/10* (2016.08)

(58) Field of Classification Search

CPC ...... F21S 2/005; F21V 23/001; F21V 23/008; F21V 23/02; F21V 23/0435; F21V 23/06; H05B 45/10; H05B 45/20; H05B 45/325; H05B 47/195; F21Y 2115/10

See application file for complete search history.

(56) References Cited

U.S. PATENT DOCUMENTS

| | | | | |
|---|---|---|---|---|
| 9,155,171 | B1 * | 10/2015 | Hughes ................ | H05B 47/187 |
| 9,338,860 | B2 * | 5/2016 | Radermacher ....... | H05B 47/187 |
| 9,488,997 | B1 * | 11/2016 | Dwelley ............. | H04L 41/0681 |
| 9,726,361 | B1 * | 8/2017 | May ..................... | H05B 47/185 |
| 2016/0204692 | A1 * | 7/2016 | Chen ................. | H02M 3/33546 363/21.02 |

(Continued)

*Primary Examiner* — Evan P Dzierzynski

(74) *Attorney, Agent, or Firm* — Hemisphere Law, PLLC; Zhigang Ma

(57) ABSTRACT

A quick link light, a quick link driving device, and a quick link lighting system are provided, and relate to the technical field of lighting and wiring. The quick link light is provided with at least one external port for allowing one end of a twisted-pair cable to be connected; each external port is a twisted-pair cable connector and is configured to obtain electric power required by the light for operation and/or obtain a control signal required by the light for operation and/or send a response signal. The problems of a large volume, high package costs and transportation costs, high mounting difficulty, high mounting costs, and the like of the existing light are solved effectively.

8 Claims, 33 Drawing Sheets

(56) References Cited

U.S. PATENT DOCUMENTS

| | | | | |
|---|---|---|---|---|
| 2016/0227629 | A1* | 8/2016 | Conner | H05B 47/198 |
| 2018/0294982 | A1* | 10/2018 | Boemi | H04L 12/40032 |
| 2020/0137847 | A1* | 4/2020 | Tetreault | H02J 13/00036 |
| 2022/0003379 | A1 | 1/2022 | Nichols et al. | |
| 2023/0151939 | A1 | 5/2023 | Nanai et al. | |
| 2023/0194066 | A1 | 6/2023 | Nichols et al. | |
| 2023/0345605 | A1* | 10/2023 | Beaudry | H05B 47/105 |
| 2024/0297804 | A1* | 9/2024 | Boemi | H02J 1/08 |

* cited by examiner

QUICK LINK LIGHT, DRIVING DEVICE, AND SYSTEM

TECHNICAL FIELD

The present disclosure relates to the technical field of lighting and wiring, and in particular, to a quick link light, a quick link driving device, and a quick link lighting system.

BACKGROUND

At present, household and commercial Light-Emitting Diode (LED) lights are basically provided with an internal or external power source which converts alternating current mains power into direct current power and provides constant voltage or current to drive the lights to work normally. In practical applications of this light, it is required that a mains power cable needs to be laid to the location of the light and connected to the power source, causing relatively complex mounting and wiring. This requires the skills of professional electricians and professional tools. This not only increases the difficulty of mounting, but also prolongs installation time and increases costs. Especially in some Western countries, the cost of hiring a professional electrician is relatively high.

In addition, each traditional LED light is provided with a separate driving power source, which increases the complexity and costs of a system. The power source occupies a considerable volume and weight, so that the costs of transportation and package for the light stays high.

Smart lights are becoming increasingly popular, such as a Wi-Fi light, a Bluetooth light, a Zigbee light, and a Matter light. At present, a mainstream technical solution is to configure one smart module for one light, so that the light is equivalent to a smart device. Several lights need to be mounted in one room, and more lights need to be mounted on one family. This brings two problems: First, the smart module has relatively high costs, accounting for almost 50% of the total costs of the entire smart light among low-power household light. Second, with the increase in the number of smart lights mounted, the number of equipment that can be supported by a smart gateway (such as a household Wi-Fi router) is limited, and an additional router needs to be added, which can easily cause a network latency, data loss, unstable connection of the light to a network, and other phenomena.

Therefore, there is an urgent need for a light that can be mounted and wired safely and simply like a computer connected to a network using a twisted-pair cable. It can lower the difficulty of mounting and wiring and reduce the workload of wiring, thus reducing the mounting costs. It will be a great benefit if can cancel the driver from each light. thereby reducing the volume and weight of the entire lamp, and then reducing the transportation and material costs. There is an urgent need for a lamp that can greatly reduce usage of a smart module, so that the costs of a smart light are reduced, and a load on a smart network is lowered.

SUMMARY

The present disclosure aims to provide a quick link light, a quick link driving device, and a quick link lighting system for the shortcomings in the prior art.

The present disclosure achieves the above objectives through the following technical solutions: A quick link light is provided. The light is provided with at least one external port for allowing one end of a twisted-pair cable to be inserted; each external port is a twisted-pair cable connector and is configured to obtain electric power required by the light for operation and/or obtain a control signal required by the light for operation and/or send a response signal.

In a further solution of the present disclosure, when a number of the twisted-pair cable connectors is not less than 2, any twisted-pair cable connector is configured to obtain the electric power and/or the control signal, and the remaining twisted-pair cable connectors are configured to cascade the electric power and/or the control signal between the lights.

A quick link driving device is provided, configured to drive the foregoing quick link light. The quick link driving device is provided with at least one connection port for allowing one end of a twisted-pair cable to be connected; the connection port is a twisted-pair cable connector or a twisted-pair cable hub, configured to output electric power required by the light for operation and/or a control signal required by the light for operation and/or configured to input a response signal transmitted by the light.

A quick link lighting system is provided, including:

a number of twisted-pair cables, configured to transmit electric power or transmit electric power and a control signal;

a number of quick link lights, each provided with at least one twisted-pair cable connector which is connected to one end of the twisted-pair cable, to obtain the electric power and/or the electric power and the control signal from the twisted-pair cable; and a quick link driving device, wherein an output end comprises at least one twisted-pair cable connector or twisted-pair cable hub connected to the other end of the twisted-pair cable, to generate electric power and/or a control signal required by the light for operation;

wherein the quick link driving device is the foregoing quick link driving device; and the quick link light is the foregoing quick link light.

Beneficial effects of the present disclosure are as follows:

1. The difficulty of mounting and wiring is lowered, so that even ordinary users without electrical knowledge can complete most of mounting work.

In a traditional LED lighting system, for each light, it is necessary to lay a high-voltage mains wire to a location of each light and connect the wire to the power source of each light. The whole mounting work needs to be completed by a professional electrician or a user skilled in electrics. In this solution, the twisted-pair cable is used to transmit the electric power and the control signal, so that it is safe and simple during wiring of each light. Most of connection work can be completed without electrical knowledge.

2. The package and transportation costs are reduced.

For a traditional light, its power source often occupies half of its volume and weight. According to the quick link light of the present disclosure, a separate power source for each light is canceled. Instead, all lights of a system share the same power source, which greatly reduces the volume and weight of each light, thereby reducing the package costs and the transportation costs.

3. The cost of a smart light is reduced.

In the current technical solution of the smart light, one smart module is basically provided for one light. The cost of the smart module accounts for a large part of the overall cost of the smart light, so that the price of the smart light is significantly higher than the price of a non-smart light, which to some extent hinders the popularization of the smart light. The present disclosure can control all the lights in the system with just one smart module, which greatly reduces the cost of the smart light and promotes the popularization of the smart light.

4. The networking load on the smart light is reduced.

For the traditional smart light, each light is provided with one smart module, so that one light is a smart device. An economical router usually only has a dozen of device ports, some of which have been already occupied by devices such as a mobile phone and a computer in the home. The remaining device ports are not enough to drive all the smart light in the home. Usually, more routers need to be added for expansion according to a number of lights mounted, which can easily cause disconnection of a device, response latency, and other phenomena. The present disclosure only requires one smart module to achieve smart control of a plurality of lights in a system, which greatly reduces the number of the device ports, thereby greatly reducing an expansion load on a smart network and reducing the investments on network expansion.

The performance of a 0-10V dimming system can be improved. As a length of a 0-10V dimming signal line increases, 0-10V signal voltage will decrease. As a result, the brightness of a farther light may be lower than the brightness of a closer light. Connecting more lights to the same 0-10V signal line causes a longer distance, so that the difference is more significant. According to the present disclosure, since lights in a system share one power source, the length of the 0-10V signal line with the same number of lights can be greatly reduced, and the problem of inconsistency in the signal voltage can be improved.

The performance of a system for switching a color temperature by switching on and switching off can be improved. For a traditional light that supports using a switch to switch a color temperature, one light is provided with one driving power source. Therefore, after switching on and switching off are performed for many times, some lights may run into asynchronization, and lighting colors are inconsistent. These lights may be re-synchronized only if a resetting operation is performed from time to time. Since lights in a system share one power source, the number of power sources is greatly reduced. Therefore, the probability of asynchronization is greatly decreased.

DETAILED DESCRIPTION OF THE EMBODIMENTS

Figure 1A:
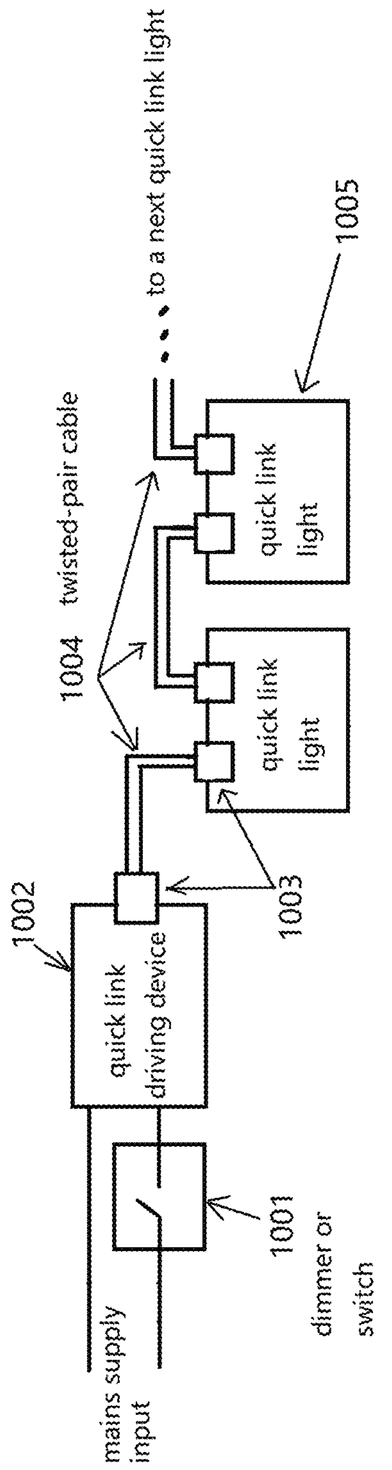
FIG. 1A is a diagram of a general structure of a quick link lighting system according to the present disclosure.

The present disclosure will be clearly and completely described below with reference to the drawings in the embodiments of the present disclosure, and it is obvious that the described embodiments are only a part of the embodiments of the present disclosure but not all of them.

In the description of the present disclosure, it should be noted that orientations or positional relationships indicated by the terms “center”, “upper”, “lower”, “left”, “right”, “vertical”, “horizontal”, “inside”, “outside”, and the like are orientations or positional relationships as shown in the drawings, and are only for the purpose of facilitating and simplifying the description of the present disclosure instead of indicating or implying that devices or elements indicated must have particular orientations, and be constructed and operated in the particular orientations, so that these terms are not construed as limiting the present disclosure. The terms “first”, “second”, and “third” are only for the purpose of description, and may not be understood as indicating or implying the relative importance. In addition, unless otherwise specified and limited, the terms “mount”, ‘link’, “connect”, and “connection” should be broadly understood. For example, it can be a fixed connection, detachable connection, integrated connection, mechanical connection, electrical connection, direct connection, indirect connection via an intermediate element, or internal communication between two elements. The terms “control signal” and “control message” have the same meaning in the description of the present disclosure, including both a single electric signal and a signal code stream composed of a plurality of electrical signals and message code stream composed of a plurality of electrical signals. For those of ordinary skill in the art, the specific meanings of the aforementioned terms in the present disclosure can be understood according to specific conditions. The terms used in this specification of the present disclosure are merely intended to describe objectives of the specific embodiments, but are not intended to limit the present disclosure.

The present disclosure uses a twisted-pair cable and a twisted-pair cable connector which are the same as those of a telephone set and a computer, to achieve electric power transmission and control signal transmission between lights and power sources, as well as between lights. The advantage is that wiring is very safe, simple, and fast, and particular electrical skills are not required. The time of mounting and wiring and the labor costs can be greatly saved.

Further, several kinds of quick link light have been further invented. These lights are characterized below:

a) There are one or more twisted-pair cable connectors. Electric power and control signals are transmitted via twisted-pair cables, so that high-voltage power lines no longer need to be laid to a location of each light.

b) Each light no longer requires a separate power source, and all lights in a system are powered by a quick link power source. This greatly reduces the cost, volume, weight, package materials, and transportation costs of the light.

Further, several kinds of quick link controllers have been invented. These controllers can be mounted in the same power box together with a power circuit or used as separate controllers. Output ports of these controllers are twisted-pair cable connectors, and are each provided with a smart module inside. Due to this module, all the lights in the system can be smartly controlled, and a load on a smart network can be greatly reduced. The network has higher stability and a higher response speed. The cost of an intelligent lamp is greatly reduced.

Further, several kinds of non-dimmable quick link constant-voltage power sources have been invented, which are characterized in that their output ports are twisted-pair cable connectors or twisted-pair cable hubs, suitable for lighting systems powered by constant-voltage power sources.

Further, a constant-voltage power source compatible with 0-10V dimming is invented, characterized in that: An output port is a twisted-pair cable connector. This power source can output constant voltage and output digitalized dimming control message according to an input 0-10V dimming signal, which can greatly improve a phenomenon of inconsistent brightness of lights caused by a 0-10V voltage drop.

Further, several kinds of quick link power source with ordinary constant-current power source circuits are invented, including ordinary dimmable constant-current power sources and ordinary non-dimmable constant-current power sources, characterized in that: Output ports are twisted-pair cable connectors or twisted-pair cable hubs, suitable for lighting systems powered by constant-current power sources.

Further, a special quick link constant-current power source is invented. An output port of this power source is a twisted-pair cable connection port. This power source can detect how many lights connected, and then adjust output current to adapt to a dynamically changing load. Namely, a number of the lights in the system can be increased or decreased. This special constant-current power source is referred to as a self-adaptive dynamic load constant-current power source (SADLCC power source).

Further, an SADLCC power source compatible with a mains dimmer is invented. The quick link light system can be compatible with the mains dimmer.

Further, an SADLCC power source that supports using a switch to switch a color temperature and is compatible with a mains dimmer is invented. Since a number of driving power sources used is reduced, compared with a traditional light using a switch to switch a color temperature, the present disclosure greatly reduces the problem that some lights need to be reset after being switched on and switched off for many times and their colors run into asynchronization.

Further, an SADLCC power source that supports using a switch to preset a color temperature and is compatible with a mains dimmer. A quick link lighting system can replace a light that supports using a switch to preset a color temperature on the current market.

Further, an SADLCC power source compatible with a 0-10V dimmer is invented.

The present disclosure includes, but is not limited to, the following elements:

(1) The twisted-pair cable mentioned in the present disclosure may include one pair of cores (CAT1), two pairs of cores (CAT2), three pairs of cores (CAT3), or four pairs of cores (CAT4, CAT5, CAT5e, CAT6, CAT6e, CAT7, CAT7e, CAT8). All of the above types of twisted-pair cable cables are collectively referred to as “twisted-pair cable” in the present disclosure.

Figure 16:
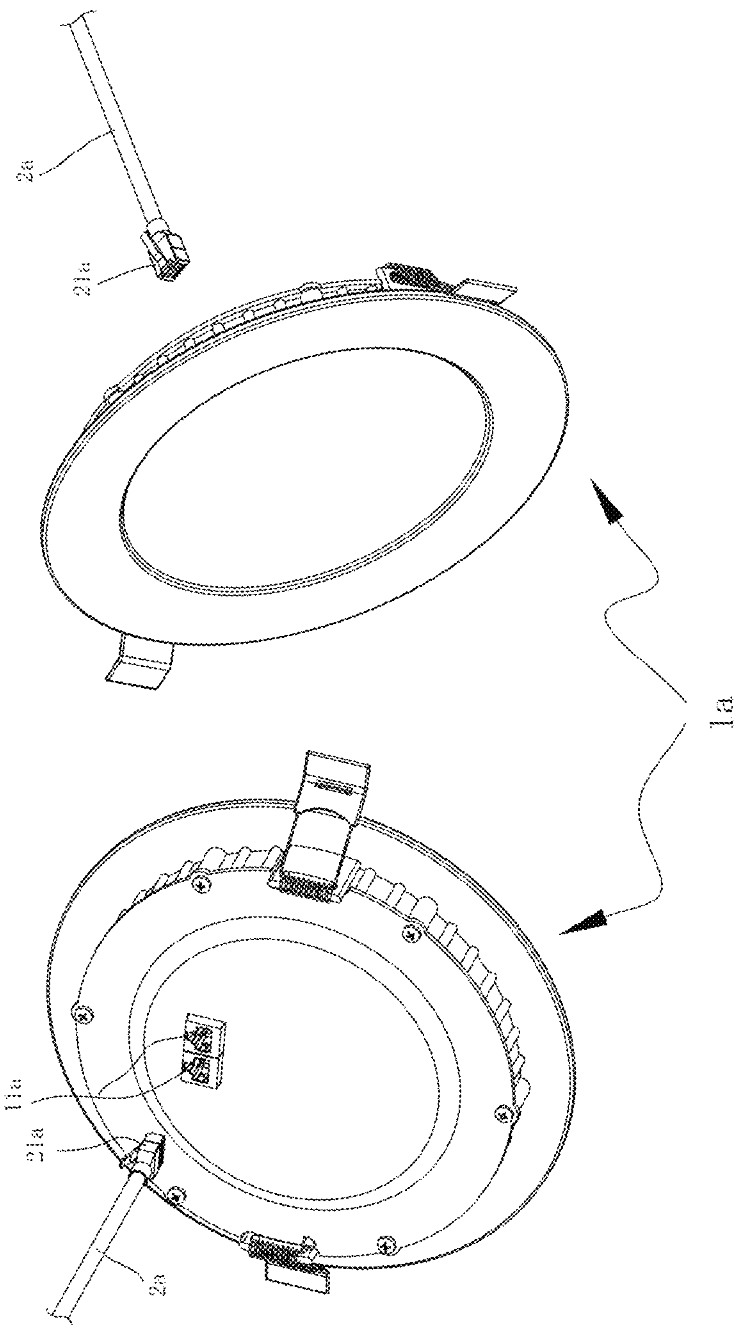
FIG. 16 is an outline drawing of a quick link light according to the present disclosure, viewed in different viewing angles.
Figure 17:
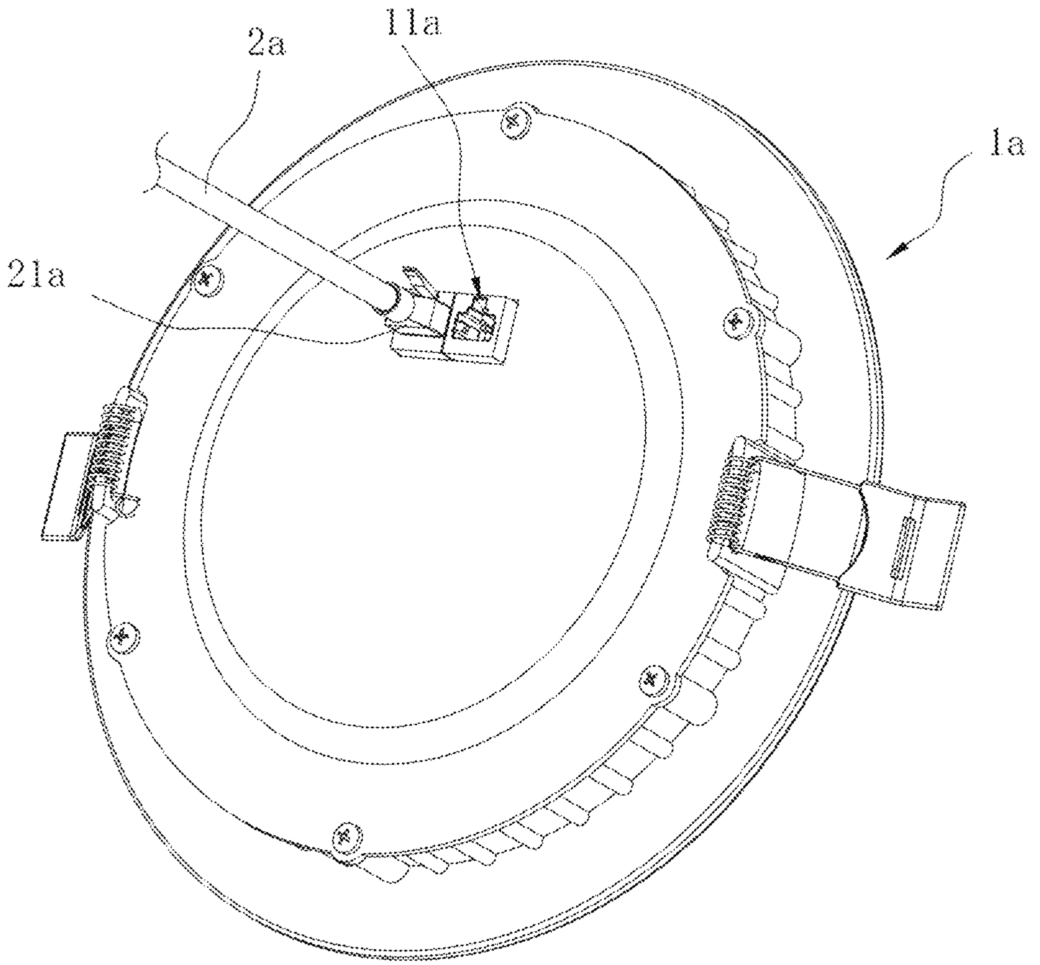
FIG. 17 is an outline drawing after a twisted-pair cable of FIG. 16 is connected to a quick link light.

(2) Plugs and sockets used for the twisted-pair cables can be RJ11, RJ12, RJ14, RJ25, or RJ45, all of which are collectively referred to as "twisted-pair cable connector" in the present disclosure. As shown in FIG. 16 and FIG. 17, a quick link light 1*a*, a socket 11*a*, a twisted-pair cable 2*a*, and a plug 21*a* are shown.

(3) In the present disclosure, a light with one or more "twisted-pair cable connectors" is collectively referred to as "quick link light".

(4) Each light body is provided with one or more "twisted-pair cable connectors".

(5) In the present disclosure, a power source with one or more "twisted-pair cable connectors", including a constant-voltage power source and constant-current power source, is collectively referred to as "quick link power source".

(6) In the present disclosure, a controller with one or more "twisted-pair cable connectors", including a controller with a built-in power source circuit and a controller with an external power source, is collectively referred to as "quick link controller".

(7) In the present disclosure, "quick link power source" and "quick link controller" are collectively referred to as "quick link driving device".

(8) Cores of a twisted-pair cable can be configured entirely to transmit electric power, or can be configured partially to transmit electric power and partially to transmit a control signal.

(9) The control signal can be transmitted using a transistor-transistor logic (TTL) level, or transmitted using a complementary metal oxide semiconductor (CMOS) logic level, or transmitted using a collector open circuit, or transmitted using a drain open circuit, or transmitted using a totem-pole circuit, or transmitted using a differential signal.

(10) A light body can include only light in one color, or light in two colors (such as warm white and cool white), or light in various colors (such as warm white+cool white+red, green, blue).

(11) A control and driving circuit of an LED light source can be arranged inside or outside the light body.

As shown in FIG. 1A, it is a diagram of a general structure of a quick link lighting system according to the present disclosure.

A mains supply input enters a quick link driving device 1002 through a switch or a dimmer 1001, and an output port of the quick link driving device is a twisted-pair cable connector 1003. Constant-voltage power or constant-current power generated by the quick link driving device, and a control signal are both transmitted to one end of a twisted-pair cable 1004 through the twisted-pair cable connector 1003. The other end of the twisted-pair cable 1004 is connected to a quick link light 1005. The quick link light 1005 has one or more twisted-pair cable connectors. For a light with two or more twisted-pair cable connectors, electric power or electric power and a control signal are input from one of the quick connectors and output from the remaining twisted-pair cable connectors to a next quick link light.

Figure 1B:
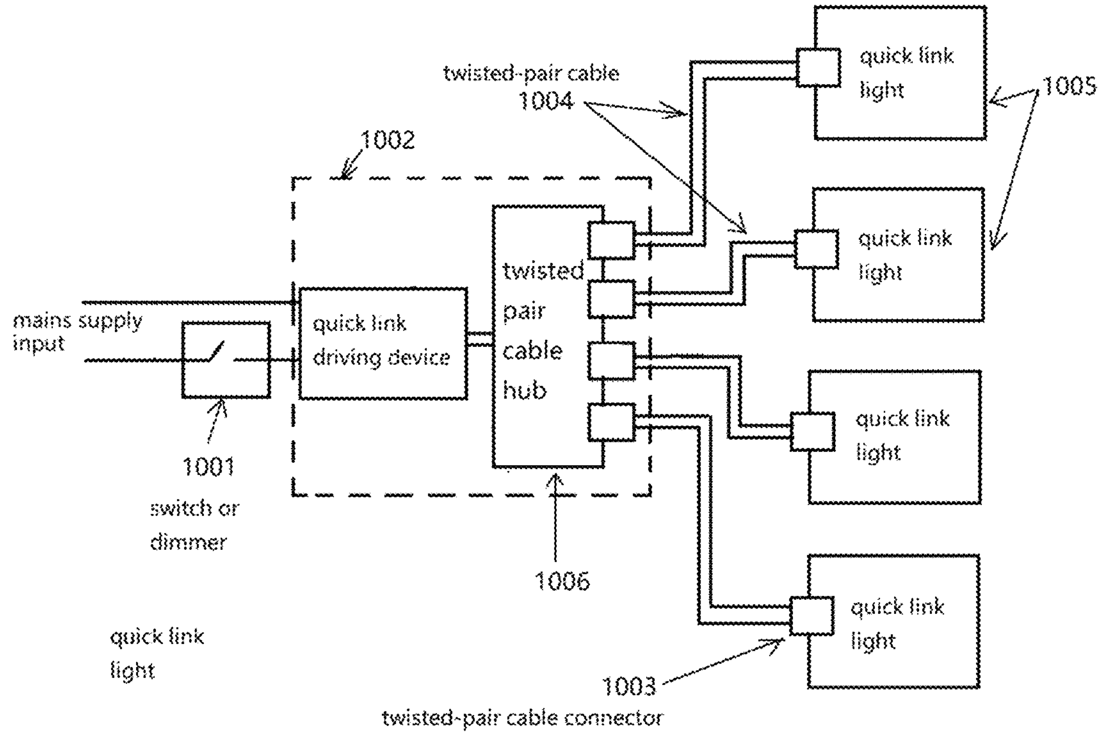
FIG. 1B is a diagram of a general structure of a quick link lighting system in another form according to the present disclosure.

As shown in FIG. 1B, it is a diagram of a general structure of a quick link light in another form according to the present disclosure.

A mains supply input enters a quick link driving device 1002 through a switch or a dimmer 1001. Electric power or electric power and a control signal output by then quick link driving device enter a twisted-pair cable hub 1006. The twisted-pair cable hub 1106 has a plurality of twisted-pair cable connectors 1003. One end of a twisted-pair cable 1004 is connected to the twisted-pair cable connectors 1003 on the hub 1106 and the other end is connected to a twisted-pair cable connector 1003 of a quick link light 1005.

Figure 1C:
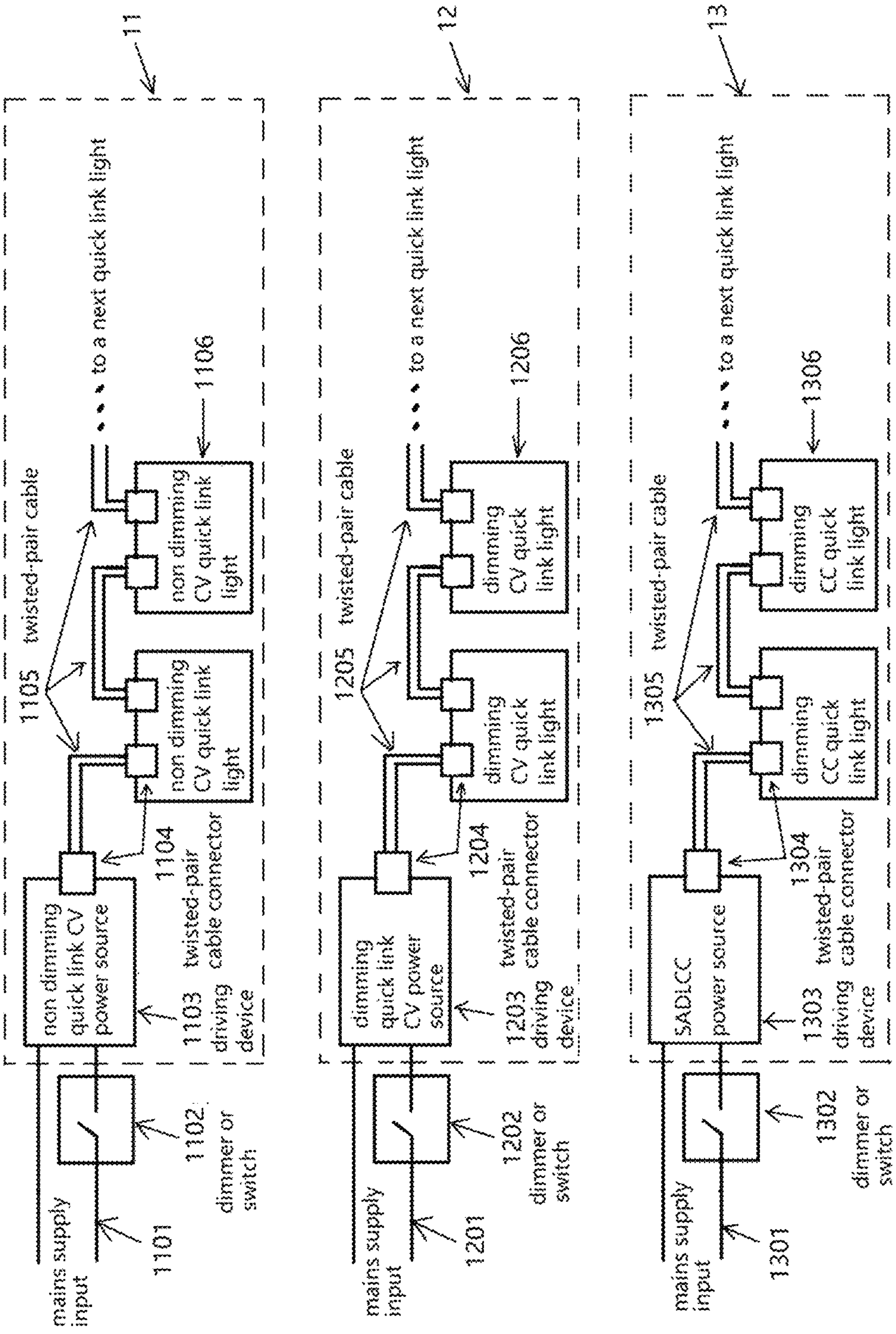
FIG. 1C is a block diagram of three types of embodiments of quick link lighting systems according to the present disclosure.

As shown in FIG. 1C, it is a block diagram of three types of embodiments of quick link lighting systems according to the present disclosure. The dashed lines 11 show a first embodiment of quick link lighting system, which is characterized in that a quick link driving device is a non-dimmable quick link constant-voltage power source. Mains supply 1101 enters a quick link driving device 1103 through a switch 1102. The quick link driving device 1103 is a non-dimmable quick link constant-voltage power source. The power source converts the input alternating-current mains supply into constant-voltage direct current and outputs it to a twisted-pair cable connector 1104. The constant-voltage direct current is then transmitted to a non-dimmable quick link light 1106 through the a twisted-pair cable 1105 and is cascaded to another non-dimmable quick link light 1106 in a system through the twisted-pair cable 1105. The dashed lines 12 show a second embodiment of a quick link lighting system. The characteristic of this embodiment is that a quick link driving device is a dimmable quick link constant-voltage power source. Mains supply 1201 enters a quick link driving device 1203 through a dimmer 1202. The quick link driving device 1203 is a dimmable quick link constant-voltage power source. The dimmable quick link constant-voltage power source converts, on the one hand, input alternating-current mains supply into constant-voltage direct current, converts, on the other hand, a dimming signal from the dimmer or a remote controller into a light control signal, and outputs the direct current and the light control signal to the twisted-pair cable connector 1204. The direct current and the light control signal are then transmitted to a dimmable quick link light 1206 through the a twisted-pair cable 1205 and are cascaded to another dimmable quick link light 1206 in a system through the twisted-pair cable 1205. The dashed lines 13 show a third type of quick link lighting system. The characteristic of this type of embodiment is that a quick link driving device is a self-adaptive dynamic load constant-current power source (SADLCC power source). Mains supply 1301 enters a quick link driving device 1303 through a switch (or a dimmer) 1302. The quick link driving device 1303 is a self-adaptive dynamic load constant-current power supply. This power supply can automatically detect a number of lights that are currently connected into a system and output operating current with a corresponding magnitude. Meanwhile, the power source converts a dimming signal from the dimmer into a light control signal and outputs the output current and the output light control signal to a twisted-pair cable connector 1304. The output current and the output light control signal are then transmitted to a dimmable quick link light 1306 through a twisted-pair cable 1305 and are cascaded to another dimmable quick link light 1306 in a system through the twisted-pair cable 1305.

Figure 1D:
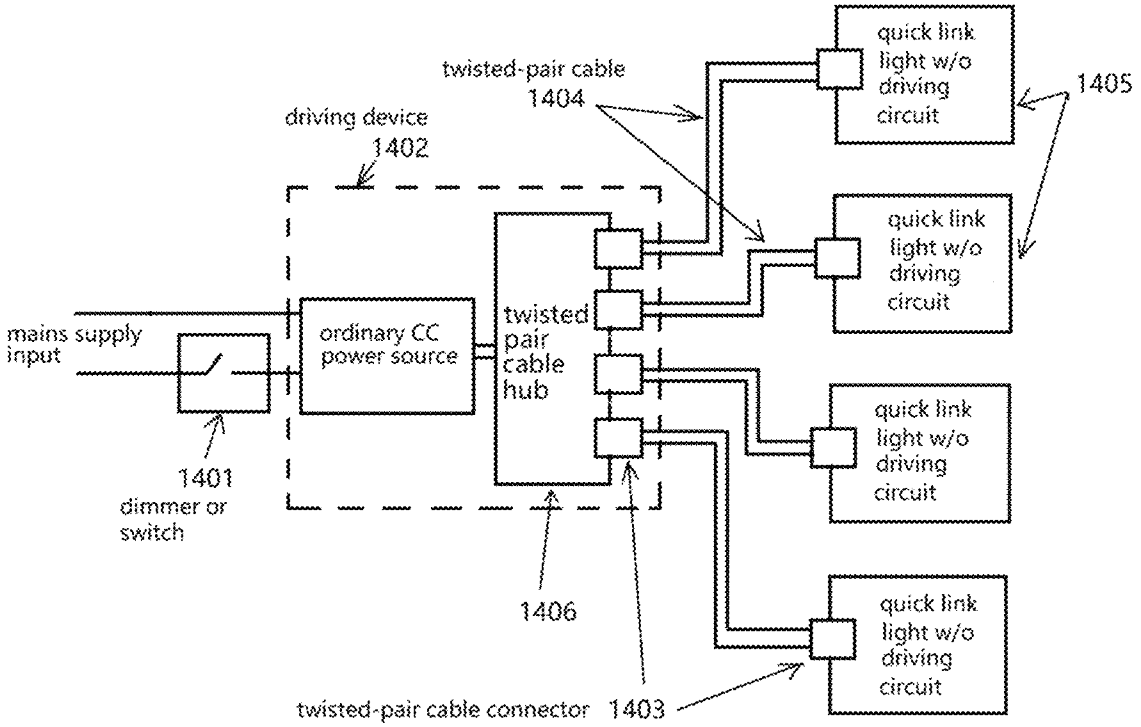
FIG. 1D is a block diagram of a fourth type of an embodiment of a quick link lighting system according to the present disclosure.

As shown in FIG. 1D, it is a fourth type of an embodiment of a quick link lighting system of the present disclosure, which is characterized in that a quick link driving device is an ordinary constant-current power source and a twisted-pair cable hub. Mains supply enters an ordinary constant-current power source 1402 through a switch or a dimmer 1401. The ordinary constant-current power source 1402 can be a non-dimmable constant-current power source or a dimmable constant-current power source. Current output by the ordinary constant-current power source 1402 is transmitted to a twisted-pair cable hub 1406. The twisted-pair cable hub 1406 equipped with a plurality of twisted-pair cable connectors 1403. The current is transmitted to quick link lights 1405 via twisted-pair cable connectors 1403 and twisted-pair cables 1404. There is no driving circuit inside each quick link light 1405 in this embodiment. The number of the quick link lights 1405 needs to match the current output by the ordinary constant-current power source, and the number of the quick link lights 1405 may not be increased or decreased after powering on. Furthermore, the twisted-pair cables connected to the lights 1405 need to have equal lengths, to avoid a significant difference in brightness of the lights.

Figure 2A:
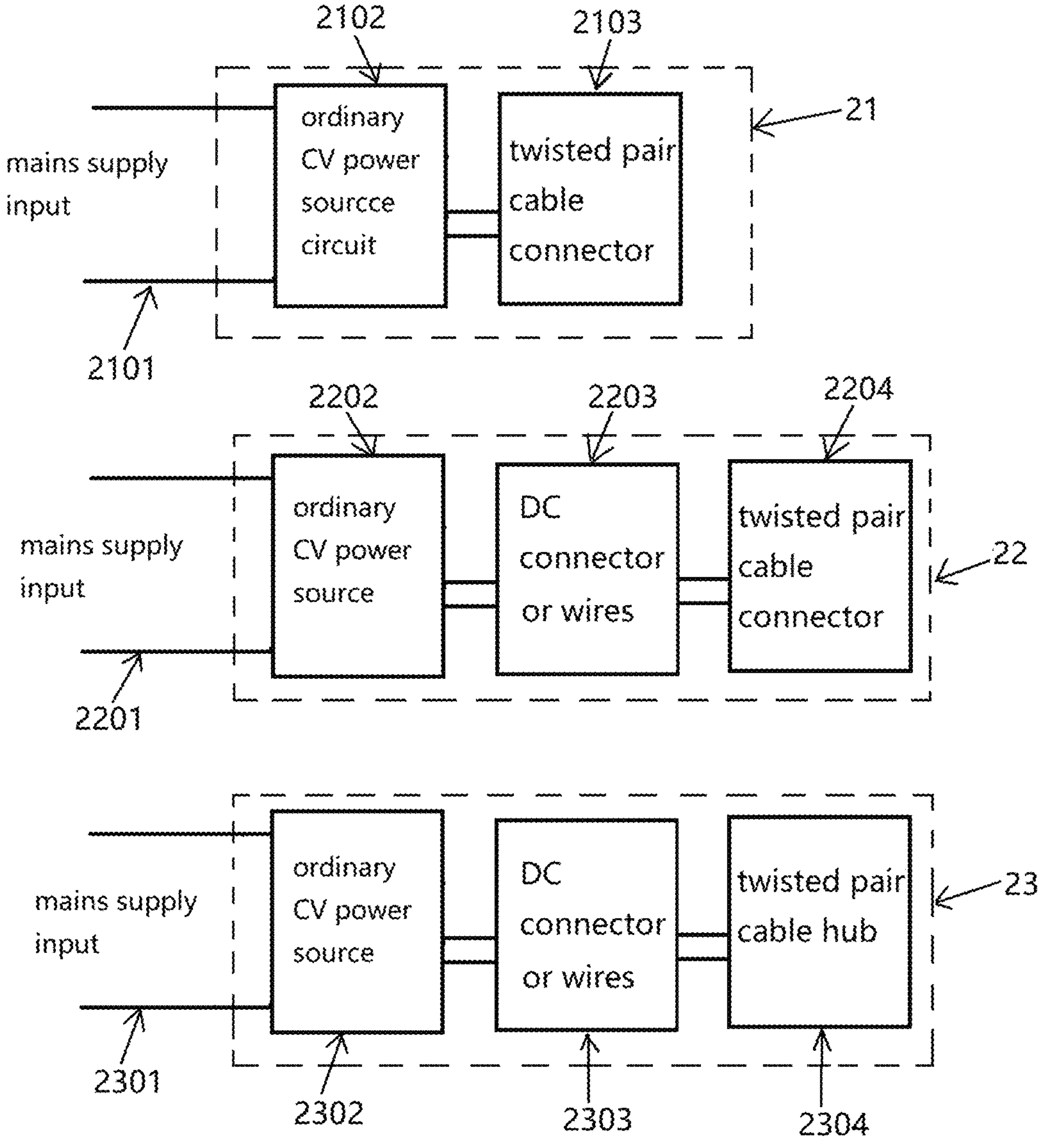
FIG. 2A is a block diagram of three kinds of quick link driving devices according to the present disclosure.

As shown in FIG. 2A, it is a block diagram of three kinds of quick link driving devices according to the present disclosure. The quick link driving device represented by the dashed lines 21 is a first implementation of a non-dimmable quick link constant-voltage power source. Input alternating current 2101 enters a conventional constant-voltage power source circuit 2102, and constant voltage is output through a twisted-pair cable connector 2103. The twisted-pair cable connector 2103 and the power source circuit are packaged as a whole in the same housing. The quick link driving device represented by the dashed lines 22 is a second implementation of a non-dimmable quick link constant-voltage power source. Input alternating current 2201 enters a conventional power source 2202. Constant voltage is first output through a DC connector or wires 2203, and then is externally connected to an independent twisted-pair cable connector 2204. The dashed lines 23 show a third implementation of a non-dimmable quick link constant-voltage power source. Input alternating current 2301 enters a conventional constant-voltage power supply 2302. Constant voltage is output through a DC plug or a wire 2303 and is connected to an external hub 2034 with a plurality of twisted-pair cable connectors.

Figure 2B:
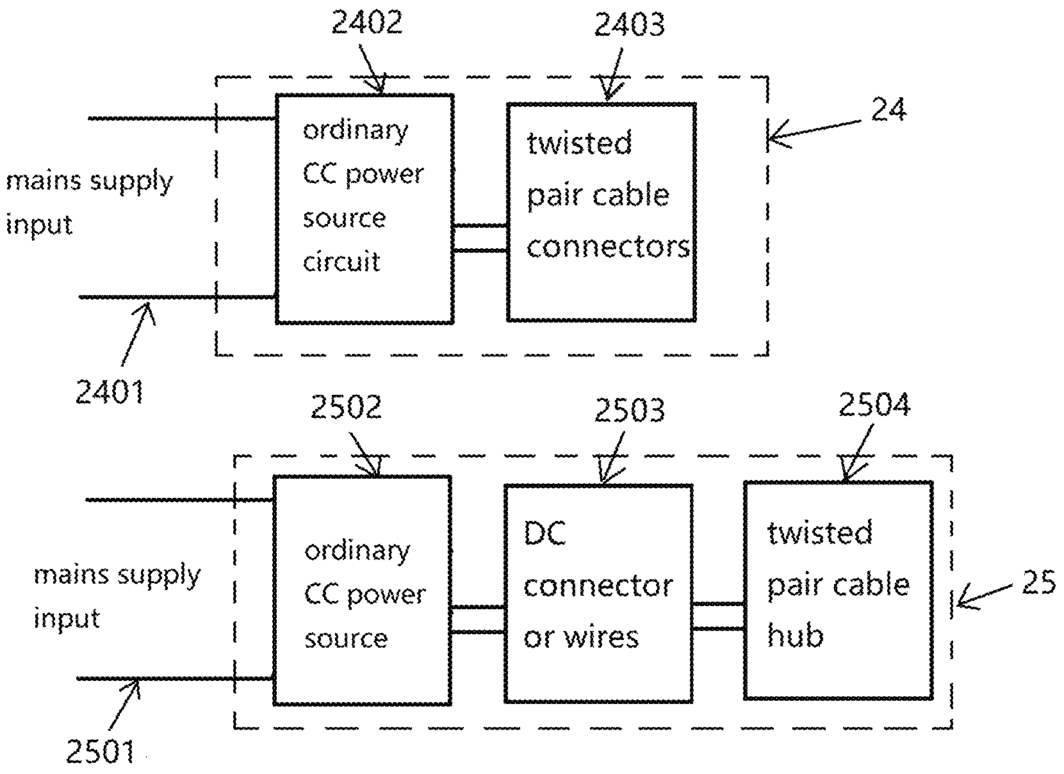
FIG. 2B is a block diagram of another two kinds of quick link driving devices according to the present disclosure.

As shown in FIG. 2B, it is a block diagram of another two kinds of quick link driving devices according to the present disclosure. According to the dashed lines 24, the quick link driving device is an ordinary constant-current power source and a twisted-pair cable connector. Mains supply 2401 enters an ordinary constant-current power source circuit 2402. The ordinary constant-current power source circuit 2402 can be a non-dimmable constant-current power source circuit or a dimmable constant-current power source circuit. Constant current output by the ordinary constant-current power source 2402 is electrically connected to one or more twisted-pair cable connectors 2403. Each twisted-pair cable connector 2403 and the ordinary constant-current power source circuit 2402 are packaged into the same housing. According to the dashed lines 25, the quick link driving device is an ordinary constant-current power source and a twisted-pair cable hub. Mains supply 2501 enters an ordinary constant-current power source circuit 2502. The ordinary constant-current power source circuit 2502 can be a non-dimmable constant-current power source or a dimmable constant-current power source. Current output by the power source 2502 is electrically connected, through a DC plug or a wire 2503, to a twisted-pair cable hub 2504 including one or more twisted-pair cable connectors. The ordinary constant-current power source 2502 and the twisted-pair cable hub 2504 of this implementation are independent of each other and not in the same housing.

Figure 3A:
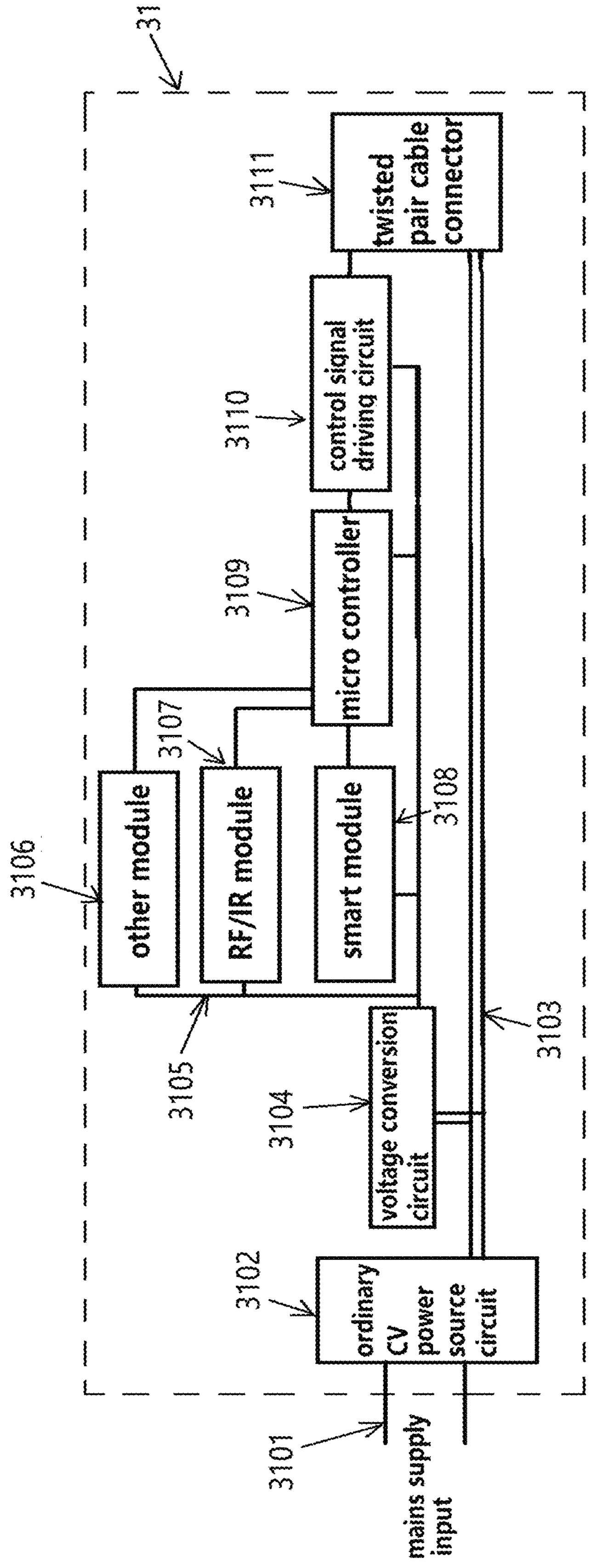
FIG. 3A is a block diagram of another kind of quick link driving device according to the present disclosure.

As shown in FIG. 3A, it is a block diagram of another quick link driving device according to the present disclosure. The quick link driving device is a quick link controller with a built-in constant-voltage power source. The quick link controller and a constant-voltage power source circuit in this implementation are packaged in the same housing. Input voltage 3101 enters a constant-voltage power source circuit 3102. Most of output constant-voltage current 3103 flows directly to a twisted-pair cable connector 3111, and a small part of the constant-voltage current enters a voltage conversion circuit 3104. The voltage conversion circuit 3104 outputs an operating voltage 3105 to a smart module 3108 or a wireless or infrared receiving module 3107 or another control module 3106 and a micro-controller 3109. The micro-controller 3109 receives a first control signal from the smart module 3108, the wireless or infrared receiving module 3107, or the another control module 3106, and then converts the first control signal into a second control signal to be transmitted to a quick link light. The second control signal is transmitted to a twisted-pair cable quick connector 3111 through a control signal driving circuit 3110. The control signal driving circuit 3110 can be a TTL level driving circuit, a CMOS level driving circuit, a collector open circuit driving circuit, a drain open circuit driving circuit, a totem-pole driving circuit, or a differential signal driving interface circuit (such as an RS485 interface circuit).

Figure 3B:
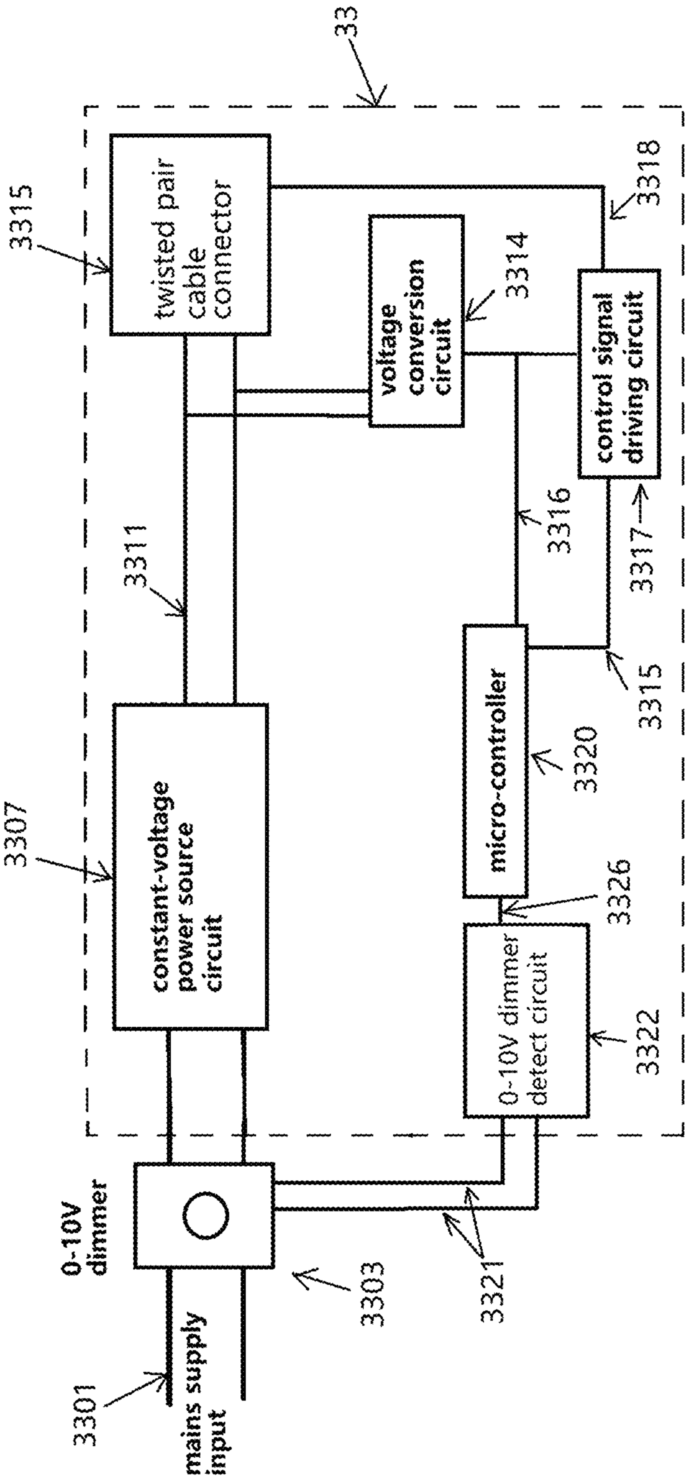
FIG. 3B is a block diagram of another kind of quick link driving device according to the present disclosure.

As shown in FIG. 3B, it is a block diagram of another quick link driving device according to the present disclosure. The quick link driving device is a quick link controller with an external constant-voltage power source. In this implementation, the quick link controller and a constant-voltage power source circuit are packaged in two independent housings. A mains supply input first enters a conventional constant-voltage power supply or a quick link constant-voltage power source 3201. Constant-voltage current output by the constant-voltage power source 3201 enters a controller circuit within the dashed lines 32 from a DC plug or a wire or a twisted-pair cable connector 3202. Most of the constant-voltage current flows directly to a twisted-pair cable connector 3209 at an output end, and a small part of the constant-voltage current enters a voltage conversion circuit 3203. The voltage conversion circuit 3203 outputs an operating voltage to a smart control module 3206, a wireless receiving module or an infrared receiving module 3205, or another control module 3204 and a micro-controller 3207. The micro-controller 3207 receives a first control signal from one or more control modules and converts the first control signal into a second control signal for controlling light. The second control signal is transmitted to the twisted-pair cable connector 3209 through a control signal driving circuit 3208. The control signal driving circuit 3208 can be a TTL level driving circuit, a CMOS level driving circuit, a collector open circuit driving circuit, a drain open circuit driving circuit, a totem-pole driving circuit, or a differential signal driving circuit. The control signal, along with the constant-voltage current from an input end of the controller, is connected to the twisted-pair cable connector 3209 and transmitted to quick link light through the twisted-pair cable connector 3209.

Figure 3C:
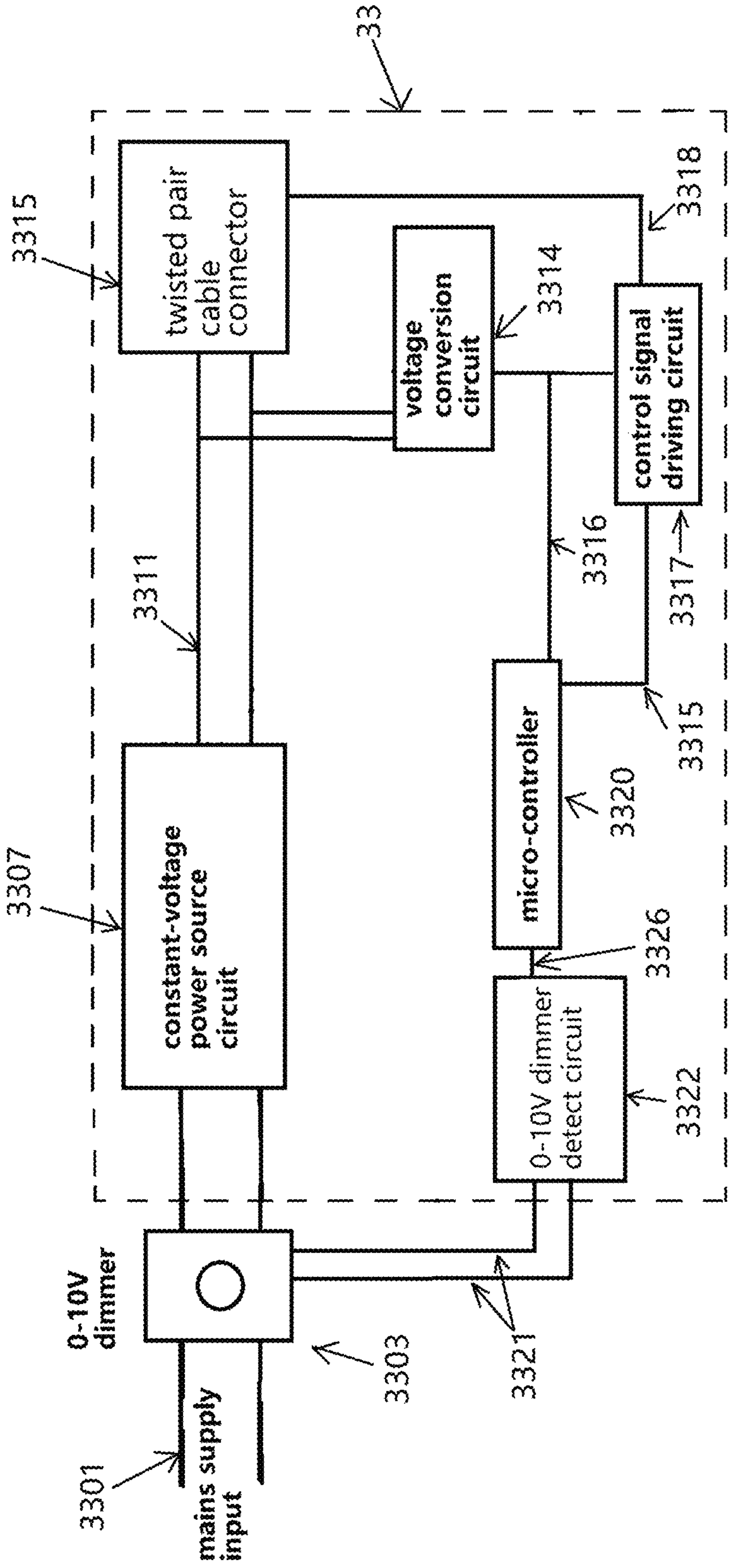
FIG. 3C is a block diagram of another kind of quick link driving device according to the present disclosure.

As shown in FIG. 3C, it is a block diagram of another kind of quick link driving device according to the present disclosure. This driving device is a dimmable quick link constant-voltage power source. A mains supply input 3301 enters a constant-voltage power source circuit 3307 through a 0-10V dimmer 3303, and constant-voltage current 3311 is output to a twisted-pair cable connector 3315. Meanwhile, the 0-10V dimmer 3303 outputs a 0-10V dimming signal 3321 to a 0-10V dimmer detection circuit 3322. The 0-10V dimmer detection circuit 3322 converts the 0-10V dimming signal into a PWM duty cycle signal 3326. A micro-controller 3320 detects the PWM duty cycle signal 3326 and outputs a control signal 3319 to a control signal driving circuit 3317. The control signal driving circuit 3317 is a TTL interface circuit, a CMOS logic interface circuit, a collector open interface circuit, a drain open interface circuit, a totem-pole interface circuit, or a differential signal driving interface circuit. An output of the driving circuit 3317 is connected to the twisted-pair cable connector 3315. A linear DC-DC voltage conversion circuit 3314 provides operating voltage for the micro-controller 3320.

Figure 4A:
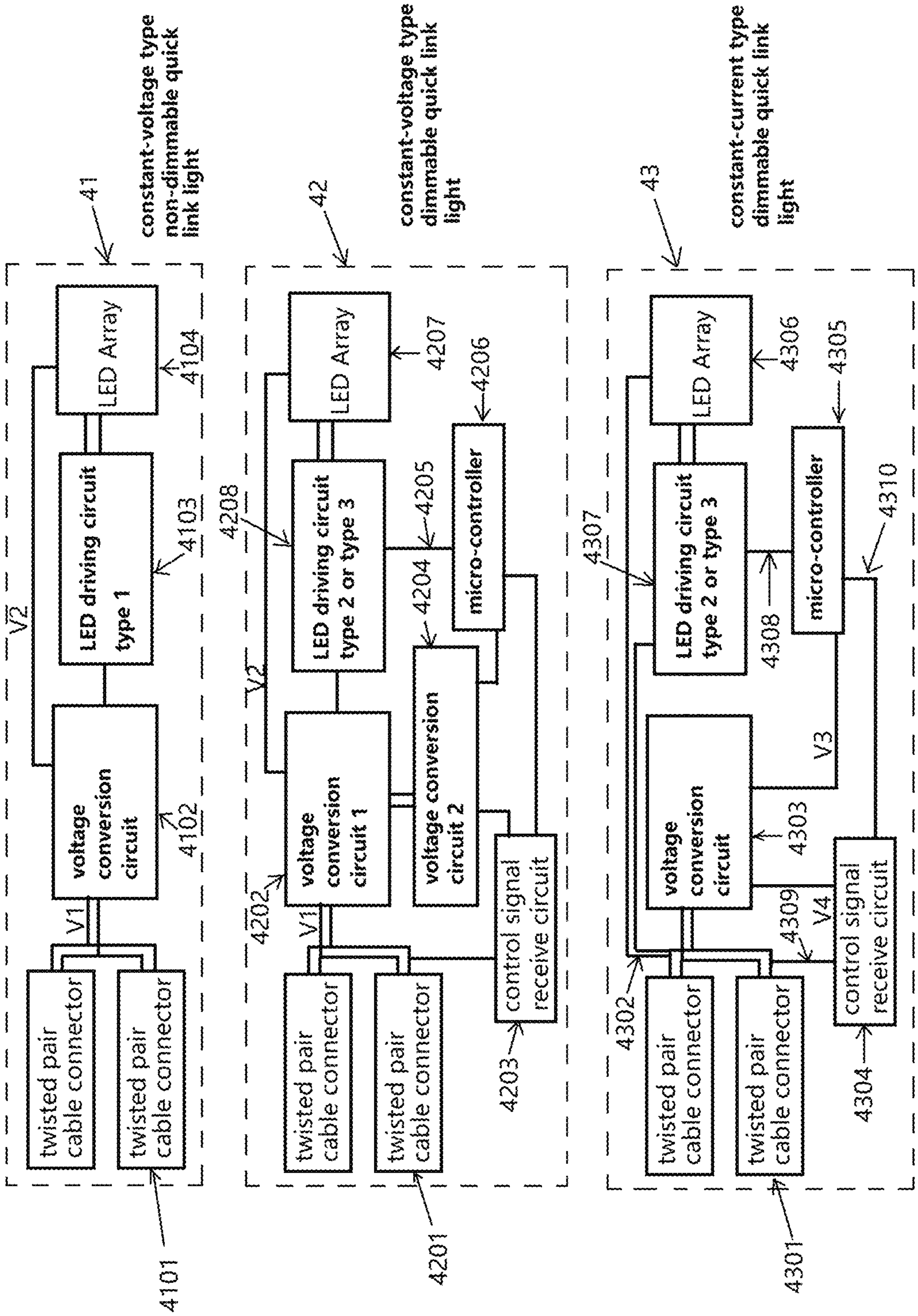
FIG. 4A is a block diagram of three kinds of quick link light according to the present disclosure.

As shown in FIG. 4A, it is a block diagram of three kinds of quick link lights according to the present disclosure. The dashed lines 41 show a block diagram of an implementation of a non-dimmable quick link light capable of being powered by constant voltage. Constant-voltage current V1 enters the non-dimmable quick link light 41 capable of being powered by constant voltage through a twisted-pair cable connector 4101. A quick link light can be provided with one or more twisted-pair cable connectors. The constant-voltage current V1 first enters a voltage conversion circuit 4102, and an operating voltage V2 is output by the voltage conversion circuit 4102. This is because there is always a little voltage drop after the voltage is transmitted to a long twisted-pair cable, so the voltage V1 reaching each quick link light is different. Therefore, the voltage conversion circuit needs to be used to obtain voltage V2 that may not change when reaching all lights in a system. This can ensure that all the lights in the system have the same brightness. The voltage conversion circuit 4102 can be a buck circuit or a boost circuit. The operating voltage V2 is output to an LED array 4104, and then returns to a driving circuit 4103. The driving circuit 4103 is an LED driving circuit of type 1. The LED driving circuit of type 1 is a non-dimmable LED driving circuit. The dashed lines 42 show a block diagram of an implementation of a dimmable quick link light capable of being powered at constant voltage. Constant voltage V1 enters a quick link light 42 through a twisted-pair cable connector 4201. V1 then enters a voltage conversion circuit 4202 to obtain an operating voltage V2. The voltage conversion circuit 4102 can be a buck circuit or a boost circuit. Operating voltage V2 is directly output to an LED array 4207 and then returns to an LED driving circuit 4208. The LED driving circuit here is type 2 or type 3. The ED driving circuit of type 2 is characterized by inputting a PWM driving signal and outputting PWM driving current, and the LED driving circuit of type 3 is characterized by inputting a PWM or I2C signal and outputting analog current. The PWM or I2C signal is generated by a micro-controller 4202. The micro-controller 4202 receives a control signal from a control signal receiving circuit 4203. The control signal of the control signal receiving circuit comes from the twisted-pair cable connector 4201. A voltage conversion circuit 4204 generates voltage required by the micro-controller and the control signal receiving circuit for operations. The dashed lines 43 show a schematic diagram of an implementation of a dimmable quick link light capable of being powered by constant current. Constant current and a control signal enter a quick link light 43 through a twisted-pair cable connector 4301. One quick link light can be provided with one or more twisted-pair cable connectors. Most of the constant current 4302 directly output to an LED array 4306, and then flows back to an LED driving circuit 4307. The LED driving circuit 4307 is a driving circuit of type 2 or type 3, and a small part of the current 4302 flows into a voltage conversion circuit 4303. The voltage conversion circuit 4303 outputs an operating voltage V3 to a micro-controller 4305 and outputs an operating voltage V4 to a control signal receiving circuit 4304. The control signal receiving circuit 4304 receives a control signal 4309, converts the control signal into a control signal 4310, and transmits the control signal to a micro-controller 4305 for decoding, so that a PWM or I2C dimming signal 4308 is generated and is provided to the LED driving circuit 4307. The control signal 4309 comes from the twisted-pair cable connector 4301.

Figure 4B:
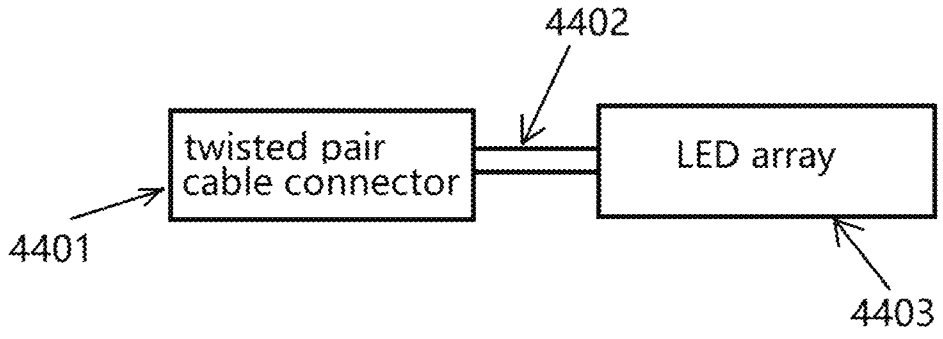
FIG. 4B is a block diagram of another kind of quick link light according to the present disclosure.

As shown in FIG. 4B, it is a block diagram of another kind of a quick link light according to the present disclosure. This light does not have an LED driving circuit inside, but only has a twisted-pair cable connector 4401 and an LED light bead array 4402. Constant current enters the light from the twisted-pair cable connector 4401, flows through the LED array 4402, and then returns to a quick link driving device through the twisted-pair cable connector 4401. This light lamp can only be suitable for a quick link driving device composed of an ordinary constant-current power source and a twisted-pair cable connector or a twisted-pair cable hub.

Figure 5A:
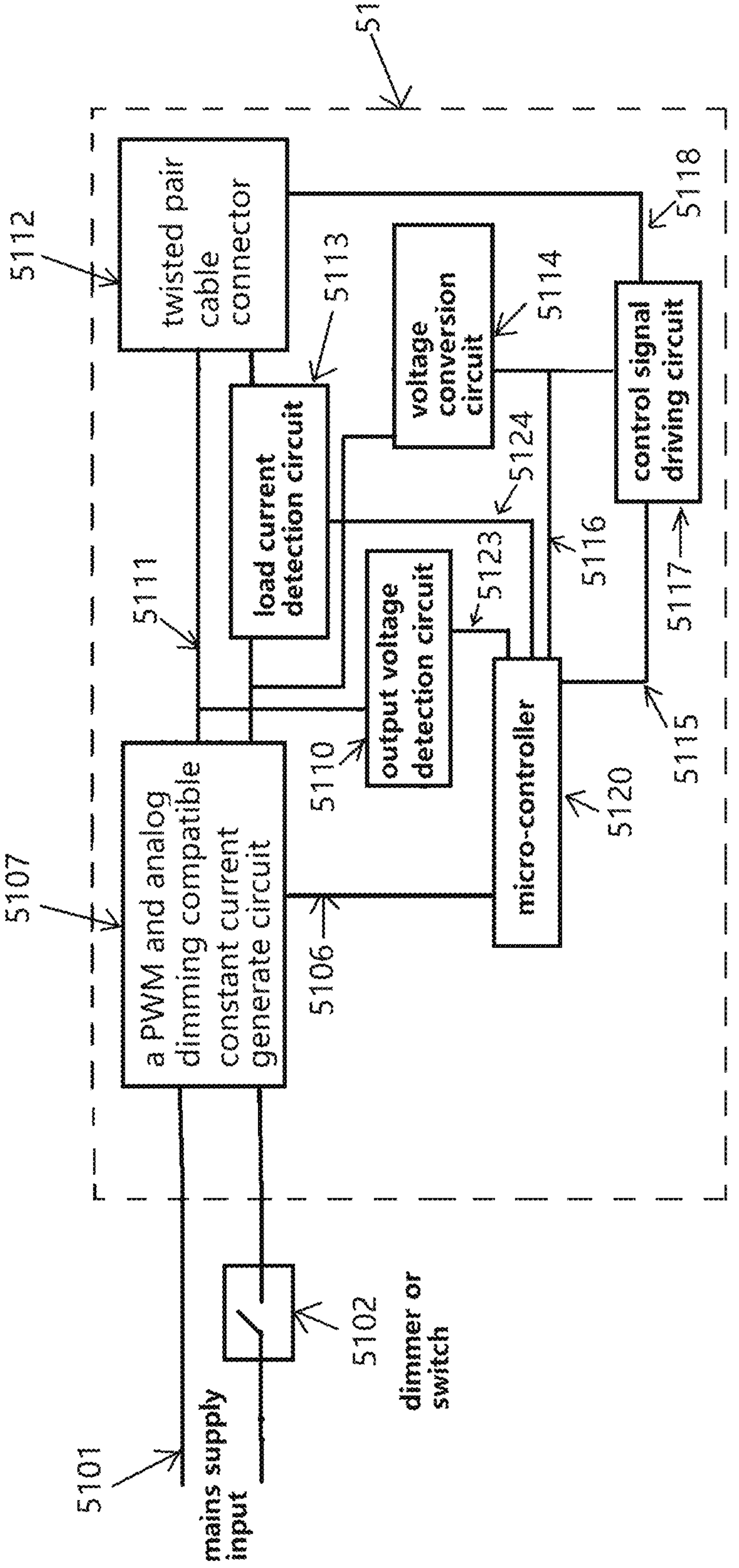
FIG. 5A is a block diagram of a basic self-adaptive dynamic load constant-current (SADLCC) power source according to the present disclosure.

As shown in FIG. 5A, the dash lines 51 show a block diagram of a basic self-adaptive dynamic load constant-current (SADLCC) power source according to the present disclosure. Input alternating current 5101 enters an ordinary constant-current generation circuit 5107 compatible with PWM dimming and analog dimming through a mains dimmer switch 5102. Current 5111 output by the constant-current generation circuit 5107 flows to a twisted-pair cable connector 5112 and then to a quick link light. The current flowing back from the quick link light flows through a load current detection circuit 5113. The load current detection circuit 5113 outputs a voltage that reflects a magnitude of load current to a micro-controller 5120. The micro-controller 5120 outputs a control signal 5115 to a control signal driving circuit 5117. The control signal driving circuit 5117 can be a TTL driving circuit, a CMOS logic driving circuit, a collector open driving circuit, or a drain open driving circuit, a totem-pole output driving circuit, or a differential signal driving interface circuit. The control signal driving circuit 5117 outputs an enhanced control signal to a twisted-pair cable connector 5112. An output voltage detection circuit 5110 samples output voltage 5111 and outputs it to the micro-controller 5120. According to a software implementation algorithm of a basic SADLCC power supply described in FIG. 14, the micro-controller 5120 calculates a number of lights that are currently connected in the system, outputs a PWM signal 5106 to adjust the output current of the constant-current generation circuit 5107. A DC-DC conversion circuit 5114 provides voltage required by the micro-controller and the control signal driving circuit for operations.

Figure 5B:
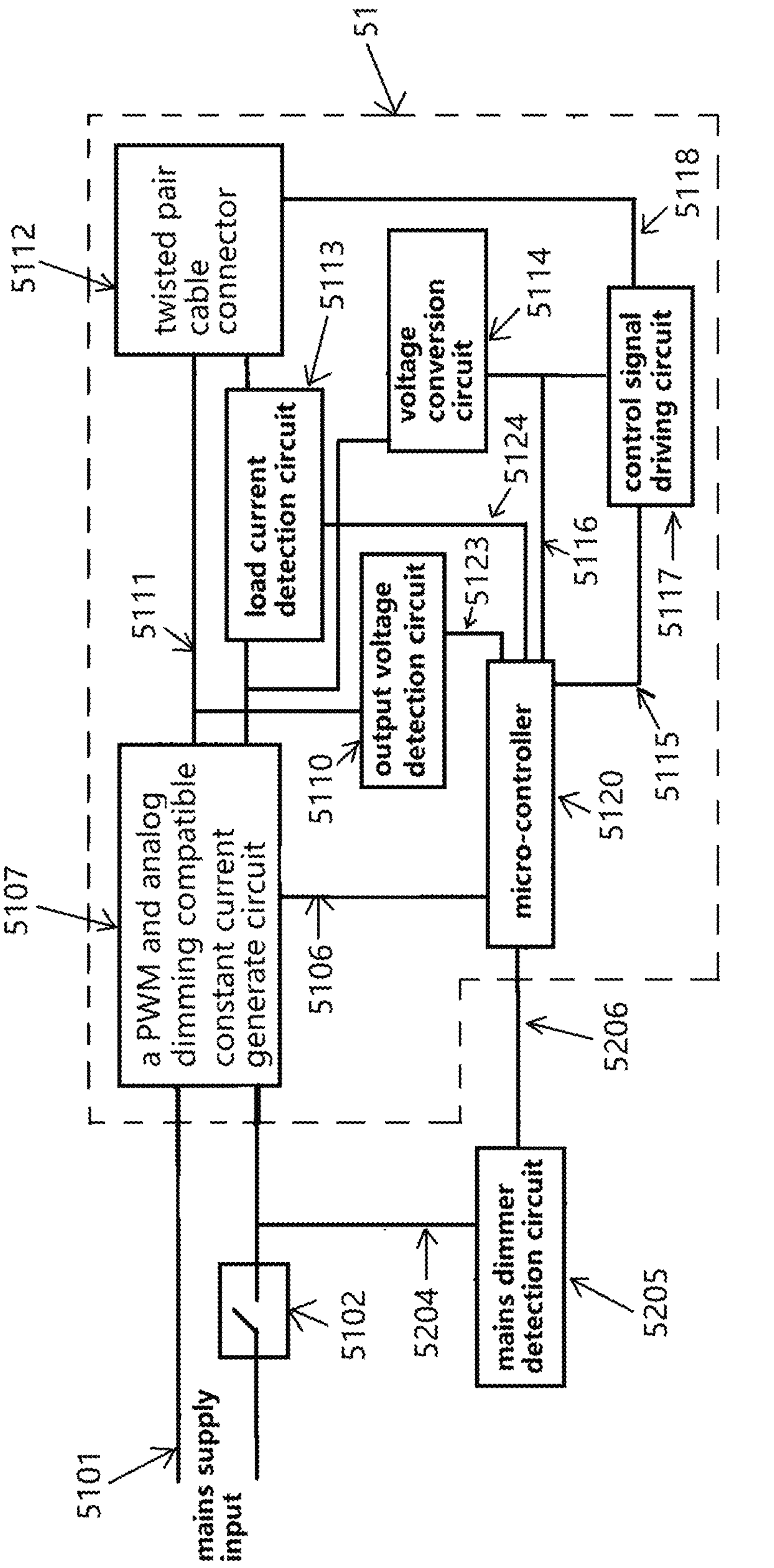
FIG. 5B is a block diagram of an SADLCC power source compatible with a mains dimmer according to the present disclosure.

As shown in FIG. 5B, it is a block diagram of an SADLCC power source compatible with a mains dimmer according to the present disclosure. The dashed lines 51 show a basic SADLCC power source, which is completely consistent with the description of FIG. 5A. Dimming voltage 5204 output by a mains dimmer 5102 passes through a mains dimmer detection circuit 5205. The detection circuit 5205 converts the mains dimming voltage 5204 into a PWM duty cycle signal 5206. The duty cycle signal 5206 is output to a micro-controller 5120. The micro-controller 5120 adjusts output current of an SADLCC according to a software implementation algorithm described in FIG. 15.

Figure 5C:
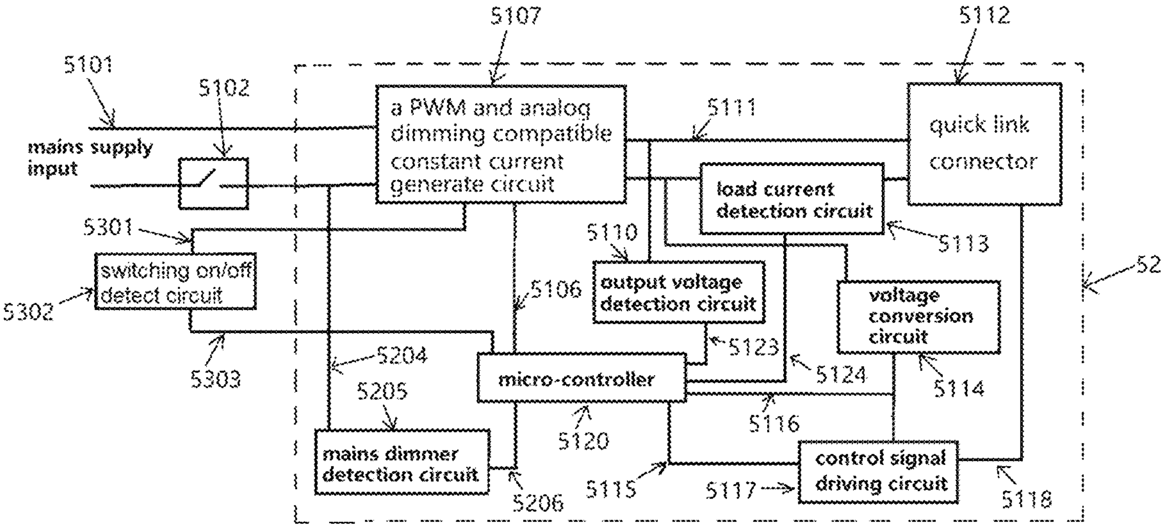
FIG. 5C is a block diagram of an SADLCC power source that supports using a switch to switch a color temperature and is compatible with a mains dimmer according to the present disclosure.

As shown in FIG. 5C, it is a block diagram of an SADLCC power supply that supports using a switch to switch a color temperature and is compatible with a mains dimmer according to the present disclosure. The dashed lines 52 show an SADLCC power source compatible with a mains dimmer, which is completely consistent with the description in FIG. 5B. An on/off state detection circuit 5302 detects an on/off state of a mains supply switch and transmits the on/off state to the micro-controller 5120. The micro-controller 5120 sends a color temperature switching signal 5115 to the control signal driving circuit 5117 according to the state.

Figure 5D:
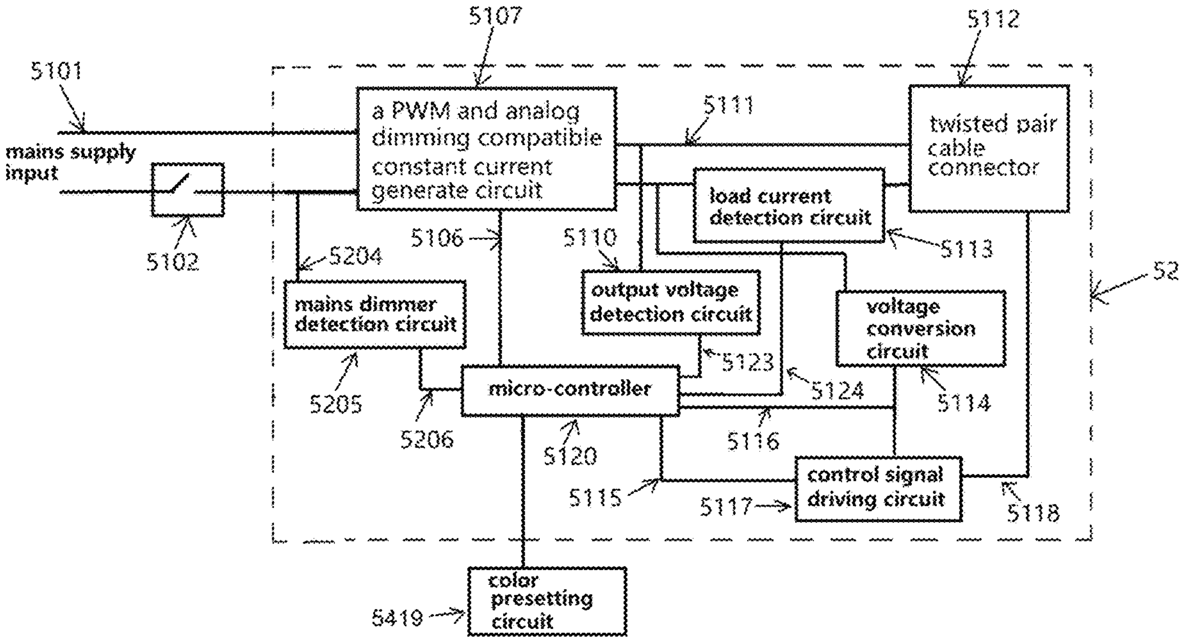
FIG. 5D is a block diagram of an SADLCC power source that supports using a switch to preset a color temperature and is compatible with a mains dimmer switch according to the present disclosure.

As shown in FIG. 5D, it is a block diagram of an SADLCC power source that supports using a switch to preset a color temperature and is compatible with a mains dimmer according to the present disclosure. The dashed lines 52 show an SADLCC power source compatible with a mains dimmer, which is completely consistent with the description in FIG. 5B. When powered on, the micro-controller 5120 detects a color temperature presetting circuit 5419 and sends the detected color temperature presetting signal 5115 to the control signal driving circuit 5117.

Figure 5E:
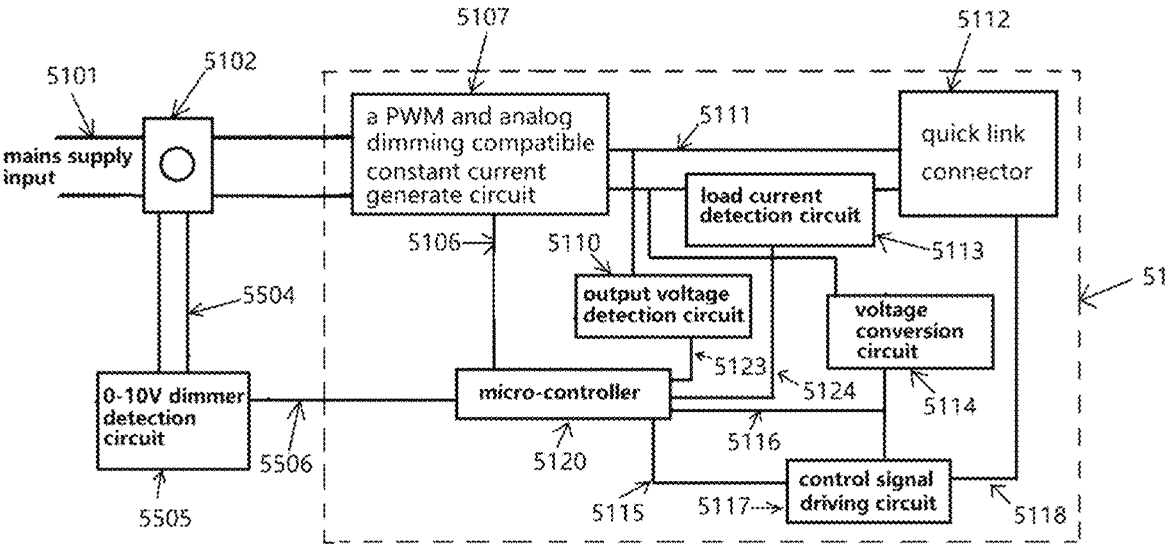
FIG. 5E is a block diagram of an SADLCC power source compatible with a 0-10V dimmer according to the present disclosure.

As shown in FIG. 5E, it is a block diagram of an SADLCC power source compatible with a 0-10V dimmer according to the present disclosure. The dashed lines 51 show a basic SADLCC power source, which is completely consistent with the description of FIG. 5A. A mains supply input passes through a 0-10V dimmer 5102, and a 0-10V dimming signal 5504 is output to a 0-10V dimmer detection circuit 5505. The detection circuit 5505 converts the 0-10V dimming signal into a PWM duty cycle signal and transmits it to the micro-controller 5120. The micro-controller 5120 detects the duty cycle signal and sends a corresponding brightness control signal 5115 to the control signal driving circuit 5117.

Figure 6A:
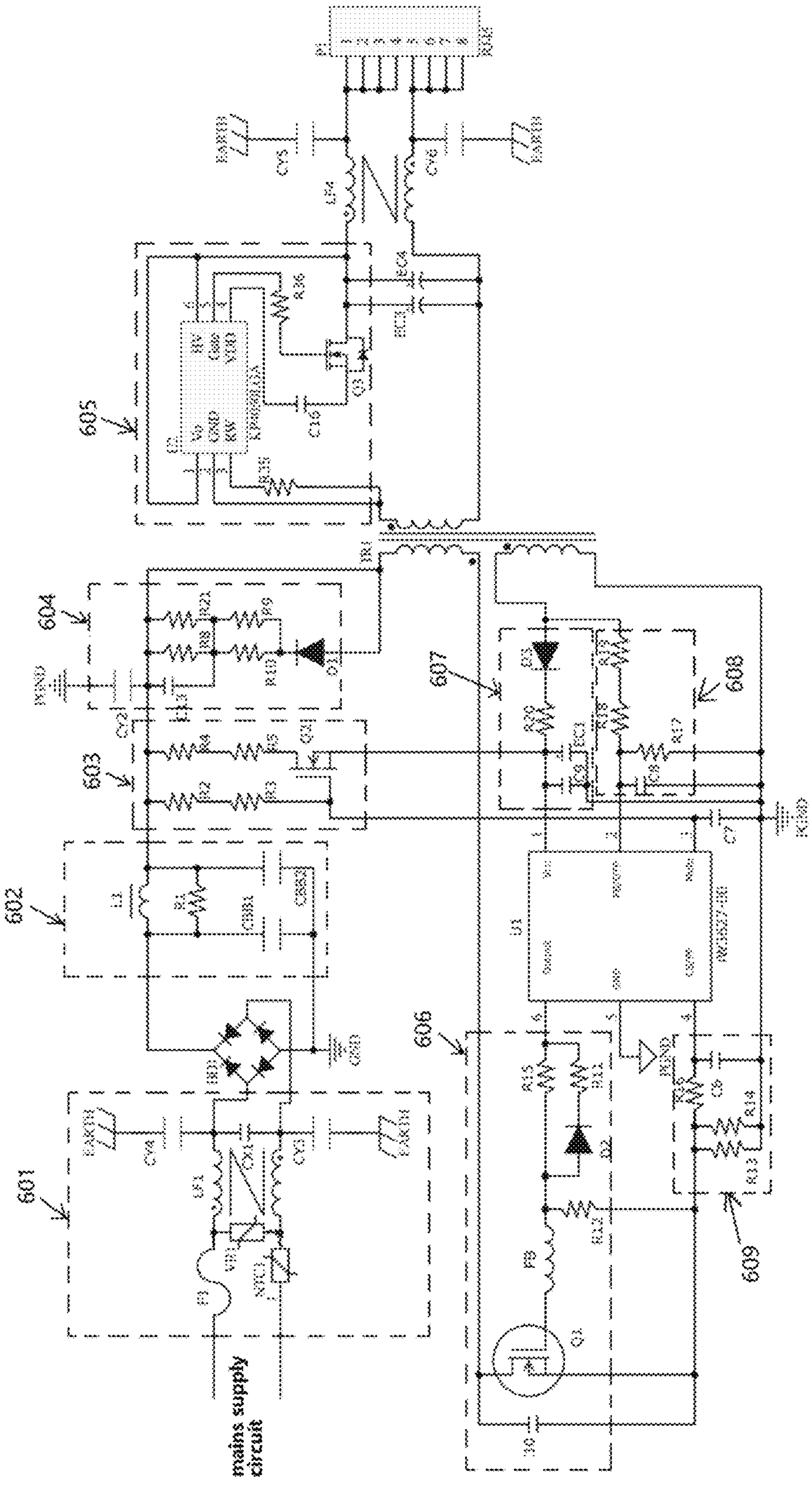
FIG. 6A is a schematic diagram of an embodiment of a non-dimmable quick link constant-voltage power source according to the present disclosure.

As shown in FIG. 6A, it is a schematic diagram of an embodiment of a quick link constant-voltage (CV) power source according to the present disclosure. A mains supply input first enters an electro-magnetic interference (EMI) filtering network 601, then passes through a bridge rectifier device BD1, and passes through another EMI filtering network 602. A circuit 603 provides starting operating current for a switch control chip U1. switch control chip U1 outputs a PWM signal to a metal oxide semiconductor (MOS) transistor driving circuit 606. The MOS transistor driving circuit 606 controls a coil of a transformer T1 to be switched on and switched off to achieve transmission of energy between a primary side and a secondary side of the transformer T1. An energy absorption circuit 604 absorbs reflected voltage reflected from the secondary side of the transformer T1, and a synchronous rectification circuit 605 converts the alternating-current voltage of the secondary side into direct-current voltage. When U1 starts to work normally, the power supply circuit 607 provides stable operating current for U1, and an output voltage detection circuit 608 assists U1 in accurately controlling voltage at an output end. For U1, a primary-side current detection circuit 609 limits maximum output current to a range set by resistors R13 and R14. The output constant-voltage current flows to a twisted-pair cable connector P1. P1 is an RJ45 socket in this embodiment.

Figure 6B:
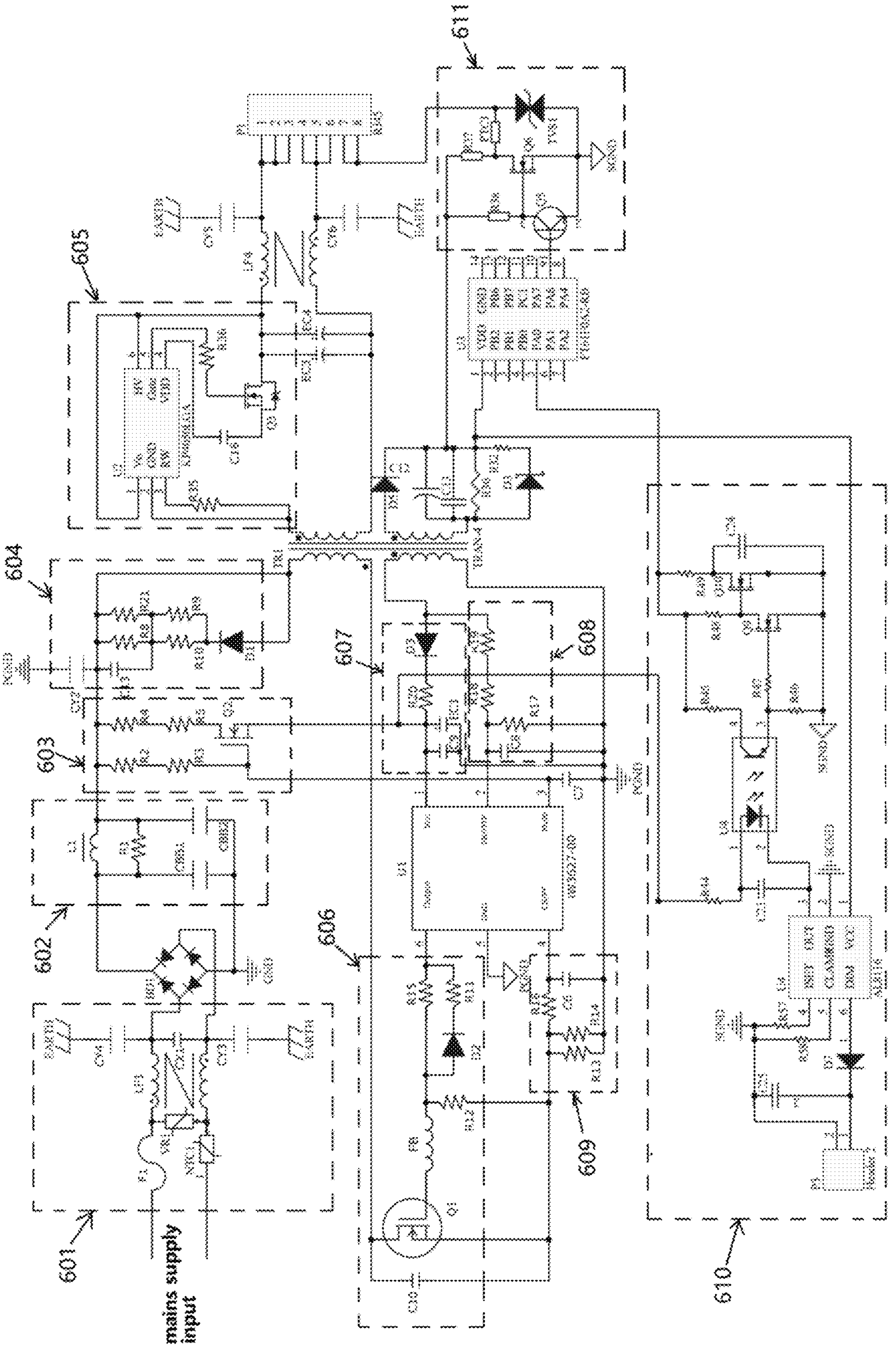
FIG. 6B is a schematic diagram of an embodiment of a dimmable quick link constant-voltage power source compatible with a 0-10V dimmer according to the present disclosure.

As shown in FIG. 6B, it is a schematic diagram of an embodiment of a dimmable constant-voltage power source compatible with a 0-10V dimmer according to the present disclosure. A mains supply input passes through an EMI filtering network 601, then through a rectifier bridge BD1, and then through another EMI filtering network 602. A starting circuit 703 provides starting voltage for a switch control chip U1. The switch control chip U1 outputs a PWM signal to a switch driving circuit 606. The switch driving circuit 606 drives a transformer T1 to transmit electrical energy from a primary side to a secondary side. An absorption circuit 604 absorbs reflected voltage from the secondary side. A synchronous rectification circuit 605 outputs direct-current voltage. A circuit 607 provides stable operating voltage for the switch control chip U1. A circuit 608 detects output voltage and feeds the output voltage back to the switch control chip U1, so that the switch control chip U1 can accurately control a value of the output voltage. A primary-side current setting circuit 609 limits maximum primary-side current by presetting resistance values of resistors R13 and R14, thereby limiting maximum output current. Output voltage is connected to a twisted-pair cable connector P1. P1 is an RJ45 socket in this embodiment. A circuit 610 is a 0-10V dimming signal conversion circuit that can convert a 0-10V dimming signal input from a plug P3 into a PWM duty cycle signal and output it to a micro-controller U3. The micro-controller U3 detects the PWM duty cycle signal and outputs a corresponding dimming signal to a control signal driving circuit 611. An enhanced control signal output by the control signal driving circuit 611 is connected to the twisted-pair cable connector P1.

Figure 7A:
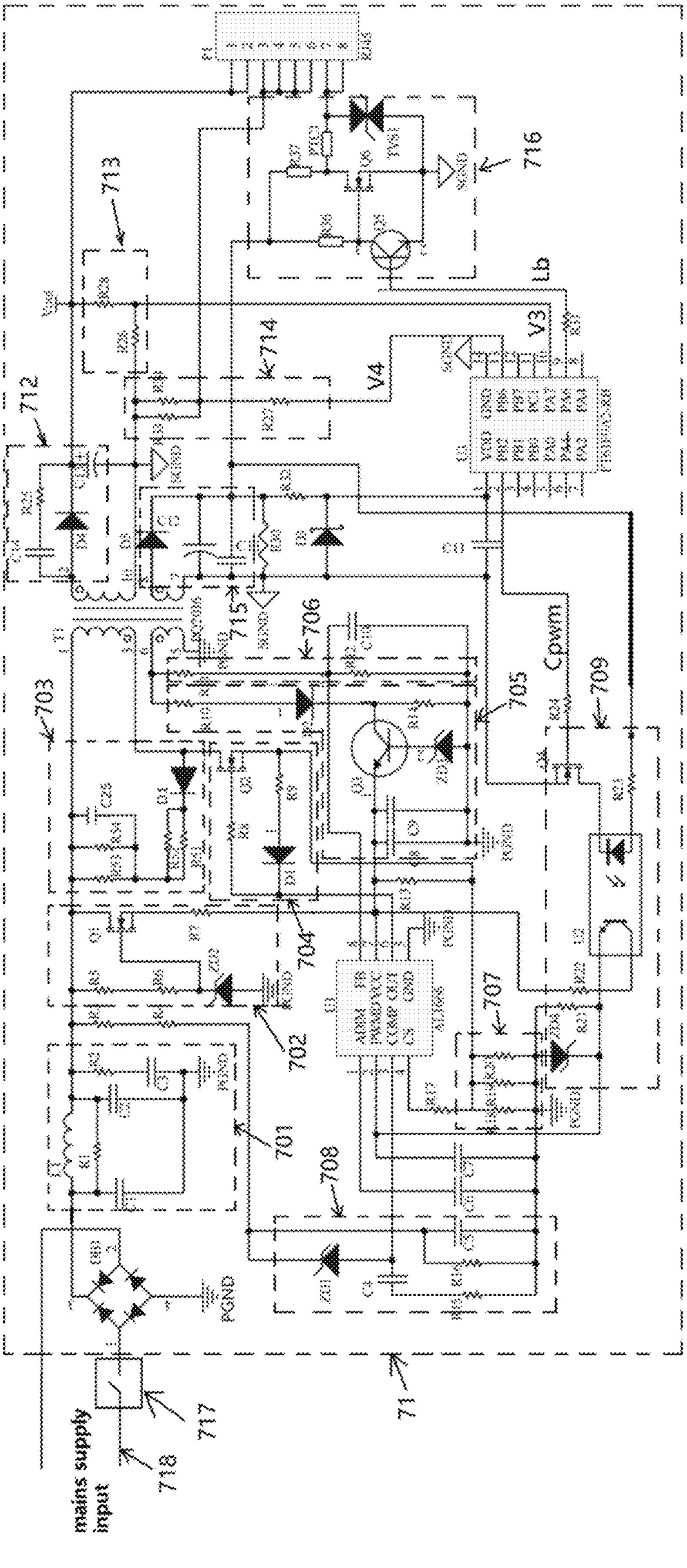
FIG. 7A is a schematic diagram of an embodiment of a basic SADLCC power source according to the present disclosure.

As shown in FIG. 7A, the dashed lines 71 show a schematic diagram of an embodiment of a basic quick link SADLCC power source according to the present disclosure. Alternating-current voltage 718 reaches a rectifier bridge BD1 through a mains dimmer 717. After the alternating-current voltage becomes direct-current voltage, the direct-current voltage passes through a filtering network 701. A circuit 702 provides starting operating current for a switch control chip U1. The control chip U1 outputs a PWM signal to control an MOS transistor driving circuit 704. The MOS transistor driving circuit 704 controls a primary-side coil of a transformer T1 to be switched on and switched off, to transmit energy to a secondary-side coil and an auxiliary coil. An absorption circuit 703 absorbs voltage reflected from the secondary side, so as to protect an MOS transistor Q2 in the circuit 704 from being broken down by high superposed voltage. A circuit 705 provides stable operating current for U1 after U1 starts to work. The control chip U1 detects output voltage of a circuit 706 to determine whether the output voltage exceeds a set range, thereby achieving overvoltage protection on the output. The control chip U1 detects voltage of a resistor array 707 to determine whether the output current exceeds a set range, thereby achieving overcurrent protection on the output. A compensation circuit 708 is configured to set system starting time to reduce overcharging current and improve power factors. A circuit 712 is configured to convert alternating-current output voltage into direct-current output voltage Vout. A circuit 715 provides operating voltage for a micro-controller U3. A circuit 713 is an output voltage detection circuit, and a circuit 714 is an output current detection circuit. The micro-controller U3 detects voltage from the circuit 714 and voltage from the circuit 713, calculates a number of lights that are currently connected in the system, and then outputs a PWM signal to an optocoupler driving circuit 709. A PWM signal output by an optocoupler U2 is configured to adjust the output current to an appropriate magnitude. A specific control process can be found in a software implementation algorithm of a basic SADLCC power supply in FIG. 14. In the adjustment process, U3 needs to continuously transmit a control signal Lb to a lamp. The control signal Lb is first transmitted to a control signal driving circuit 716. The driving circuit 716 is a TTL level driving circuit, a CMOS level driving signal, a collector open driving circuit, a drain open driving circuit, a totem-pole output driving circuit, or a differential signal output interface circuit. An enhanced control signal and the output current are both output to a twisted-pair cable connector P1. P1 is an RJ45 socket in this embodiment.

Figure 7B:
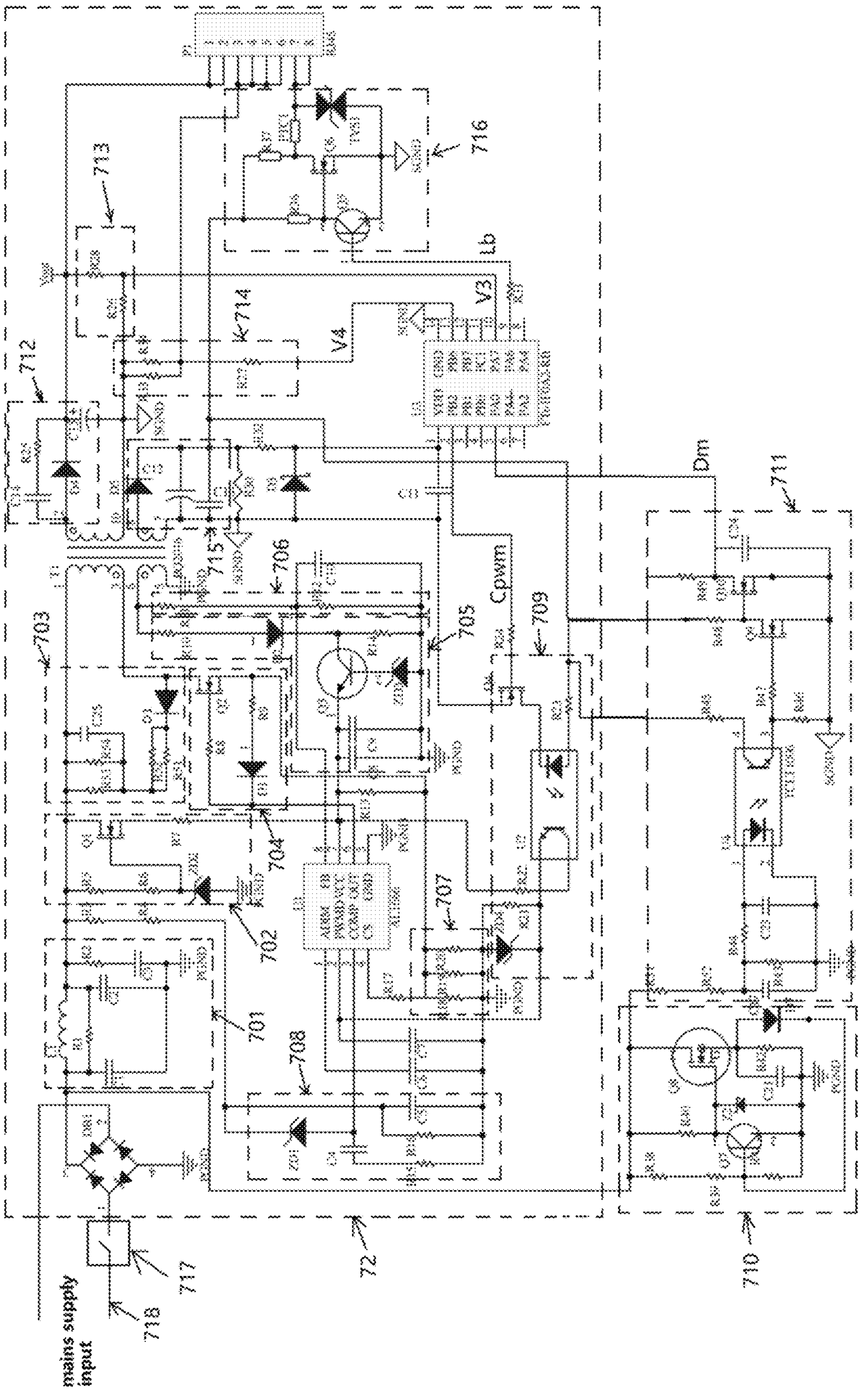
FIG. 7B is a schematic diagram of an embodiment of an SADLCC power source compatible with a mains dimmer according to the present disclosure.

As shown in FIG. 7B, it is a schematic diagram of an embodiment of an SADLCC power source compatible with a mains dimmer switch according to the present disclosure.

The dashed lines 72 show a schematic diagram of a basic SADLCC power source. This part is identical to the description in FIG. 7A. When the mains dimmer 717 is adjusted to a relatively small phase-cut angle, a holding current circuit 710 provides a holding current to the mains dimmer to prevent the mains dimmer from being turned off. A conversion circuit 711 converts the phase-cut angle output by the phase-cut dimmer switch 717 into a PWM duty cycle signal Dm. A micro-controller U3 detects the duty cycle signal Dm and then transmits brightness signal Lb to a control signal driving circuit 716.

Figure 7C:
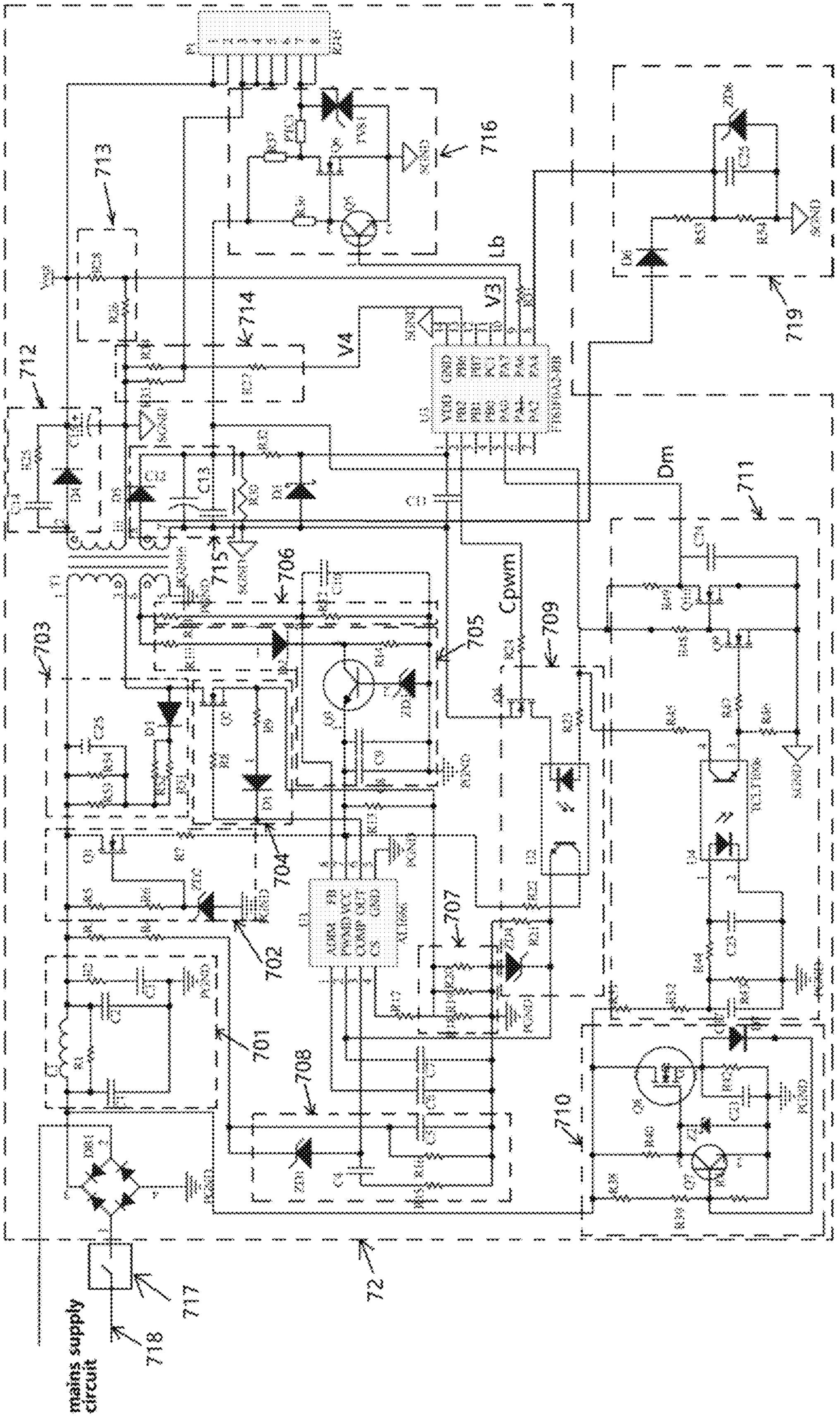
FIG. 7C is a schematic diagram of an embodiment of an SADLCC power source that supports using a switch to switch a color temperature and is compatible with a mains dimmer according to the present disclosure.

As shown in FIG. 7C, it is a schematic diagram of an embodiment of an SADLCC power source that supports using a switch to switch a color temperature and is compatible with a mains dimmer according to the present disclosure. The dashed lines 72 show a schematic diagram of an SADLCC power source compatible with a mains dimmer switch. This part is identical to the description in FIG. 7B. A mains supply switch detection circuit 719 detects an on/off state of a mains supply and outputs the state to a micro-controller U3. The micro-controller U3 transmits a color temperature switching signal to a control signal driving circuit 716 according to the on/off state.

Figure 7D:
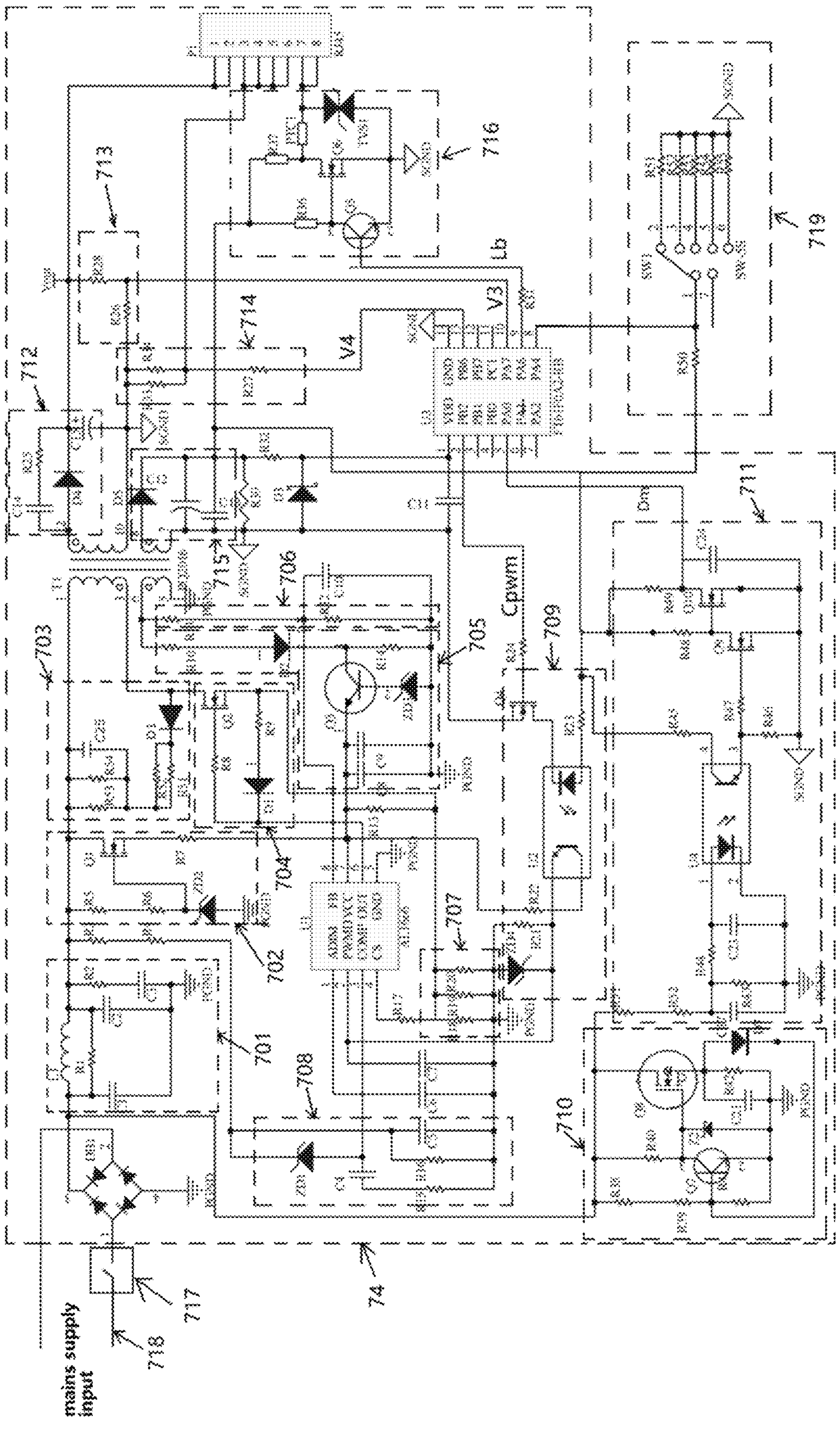
FIG. 7D is a schematic diagram of an embodiment of an SADLCC power source that supports using a switch to preset a color temperature and is compatible with a mains dimmer switch according to the present disclosure.

As shown in FIG. 7D, it is a schematic diagram of an embodiment of an SADLCC power supply that supports using a switch to set a color temperature and is compatible with a mains dimmer switch according to the present disclosure. The dashed lines 74 show a schematic diagram of an SADLCC power source compatible with a mains dimmer. This part is identical to the description in FIG. 7B. A switch setting circuit 719 includes several groups of resistors with different resistance values. A switch can be manually switch to a group of resistors. Different resistance values represent different color temperatures. After being powered on, the micro-controller U3 first detects the resistance value through A/D conversion to obtain a color temperature setting, and transmits a set color temperature signal to a control signal driving circuit 716.

Figure 7E:
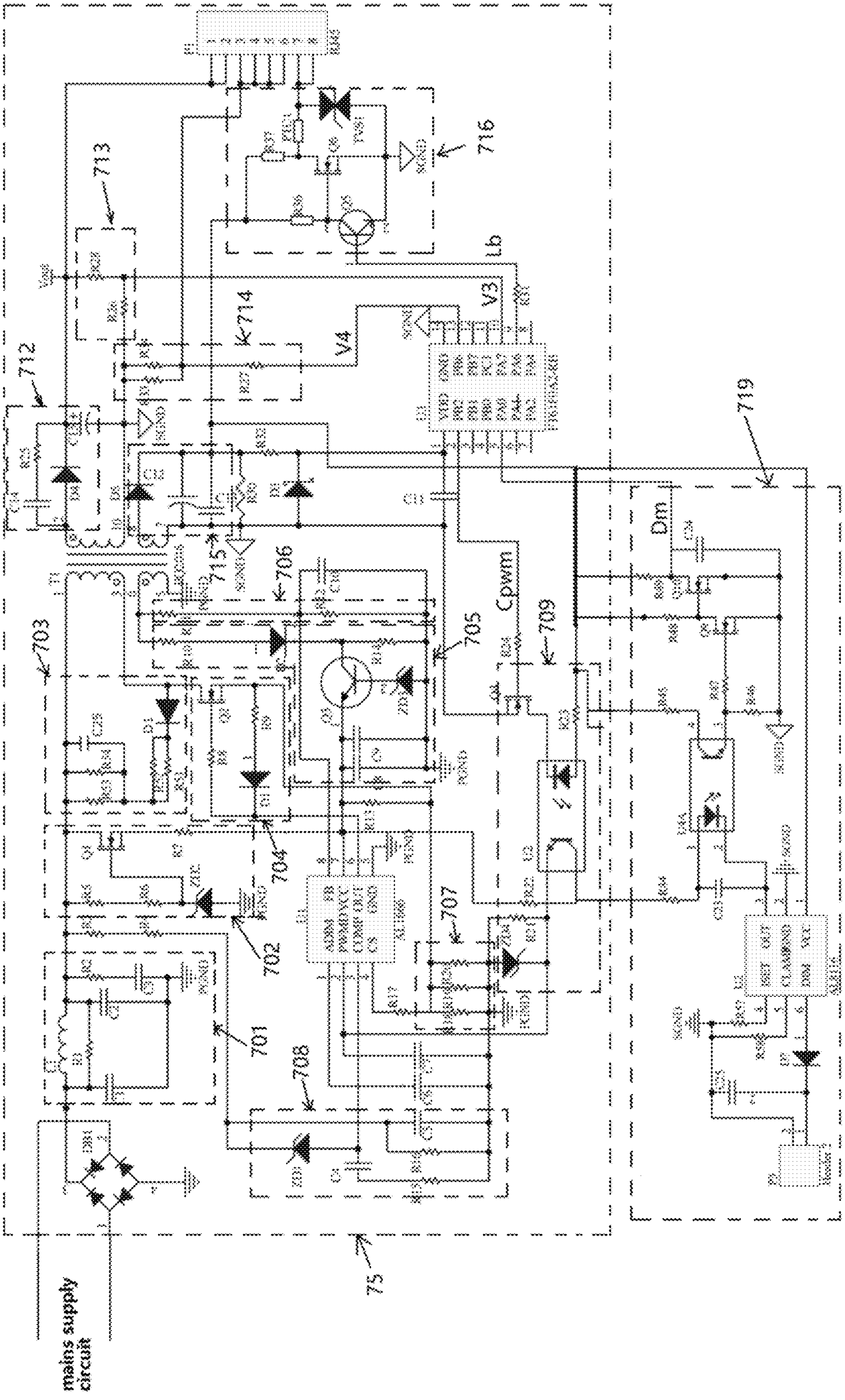
FIG. 7E is a schematic diagram of an embodiment of an SADLCC power source compatible with a 0-10V dimmer according to the present disclosure.

As shown in FIG. 7E, it is a schematic diagram of an embodiment of an SADLCC power source that supports a 0-10V dimmer switch according to the present disclosure. The dashed lines 75 show a schematic diagram of a basic SADLCC power source. This part is identical to the description in FIG. 7A. A detection circuit 719 converts a 0-10V dimming signal into a PWM duty cycle signal Dm. A micro-controller U3 detects the duty cycle signal Dm and then transmits a corresponding brightness signal Lb to a control signal driving circuit 716.

Figure 8:
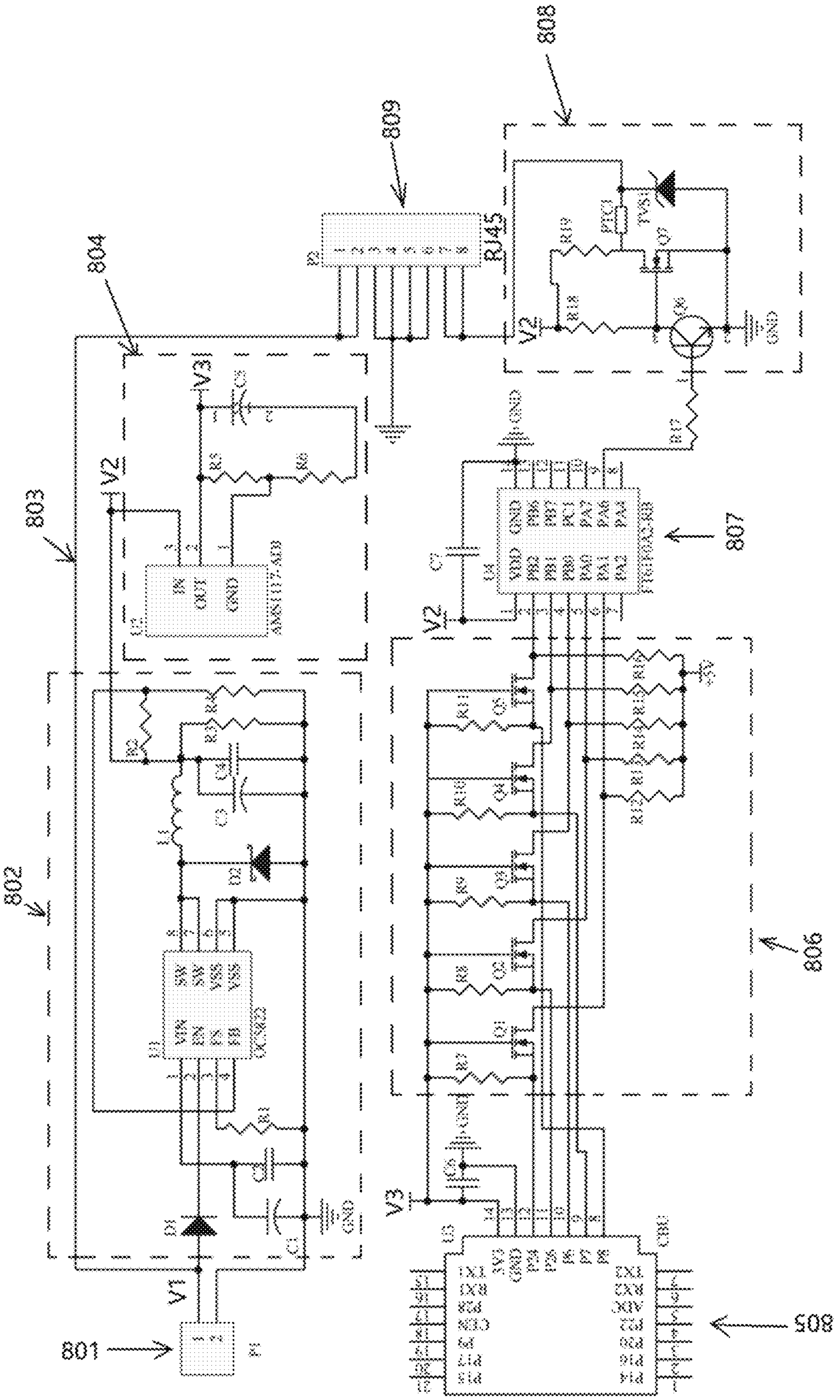
FIG. 8 is a schematic diagram of an embodiment of a quick link controller with an external constant-voltage power source according to the present disclosure.

As shown in FIG. 8, it is a schematic diagram of an embodiment of an external constant-voltage quick link controller according to the present disclosure. Constant-voltage current V1 enters the controller through a DC plug 801. Most of the constant-voltage current V1 flows directly to a twisted-pair cable connector 809. 809 is an RJ45 socket in this embodiment. A small part of the constant-voltage current V1 flows into a DC-DC conversion circuit 802. The DC-DC conversion circuit 802 outputs an operating voltage V2 to a micro-controller 807 and a control signal driving circuit 808. A part of the operating voltage V2 flows into another DC-DC conversion circuit 804, to convert this part into voltage V3, and the voltage V3 is transmitted to a smart module 805. The smart module 805 outputs five PWM signals, namely, PWM dimming signals respectively corresponding to five light colors: cool white, warm white, red, green, and blue. These PWM signals are transmitted to a micro-controller 807 through a voltage matching network 806, and the micro-controller 807 detects these PWM signals and converts the signals into light control signals. The light control signals are transmitted to a twisted-pair cable connector 809 through the control signal driving circuit 808. The control signal driving circuit 808 is a collector open driving circuit in this embodiment, and the twisted-pair cable connector 809 is an RJ45 socket in this embodiment.

Figure 9:
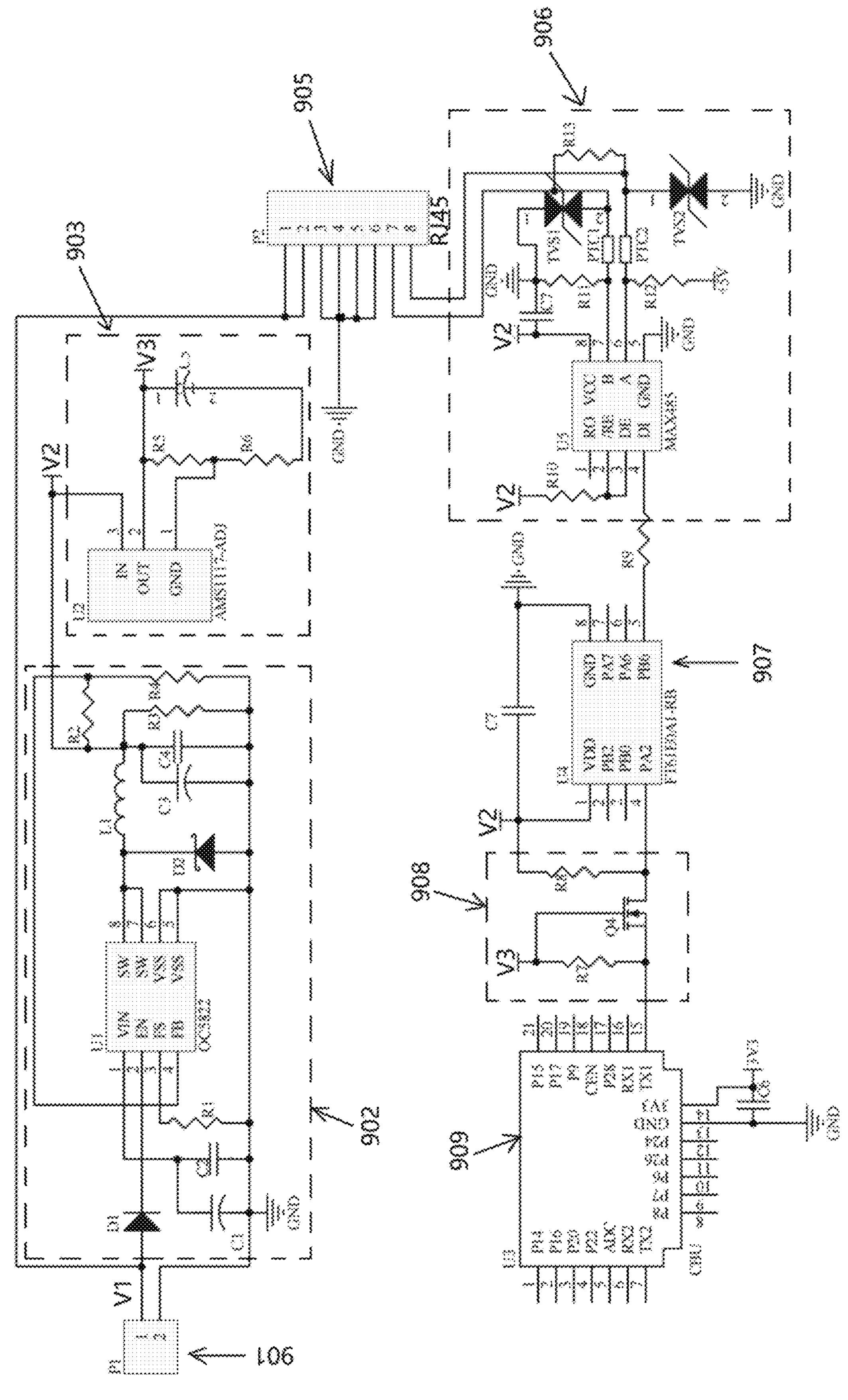
FIG. 9 is a schematic diagram of an embodiment of another quick link controller with an external constant-voltage power source according to the present disclosure.

As shown in FIG. 9, it is a schematic diagram of an embodiment of another quick link controller with an external constant-voltage power source according to the present disclosure. Constant-voltage current V1 enters the quick link controller through a DC connector 901. Most of the constant-voltage current V1 flows directly to a twisted-pair cable connector 905. A small part of the constant-voltage current V1 flows into a voltage conversion circuit 902. The voltage conversion circuit 902 outputs an operating voltage V2 to a micro-controller 907 and a control signal driving circuit 906. A part of current of the operating voltage V2 flows into another voltage conversion circuit 903. The voltage conversion circuit 903 outputs a voltage V3 to a smart module 909. The smart module 909 outputs a dimming control signal through a serial communication interface. The control signal is transmitted to the micro-controller 907 through a voltage matching circuit 908. The micro-controller 907 receives the control signal from the smart module 909, converts the control signal into a light control signal, and transmits the light control signal to the control signal driving circuit 906. The control signal driving circuit 906 is an RS485 differential signal transmission circuit in this embodiment. The control signal and the current V1 are connected to a twisted-pair cable connector 905. The twisted-pair cable connector 905 is an RJ45 socket in this embodiment.

Figure 10:
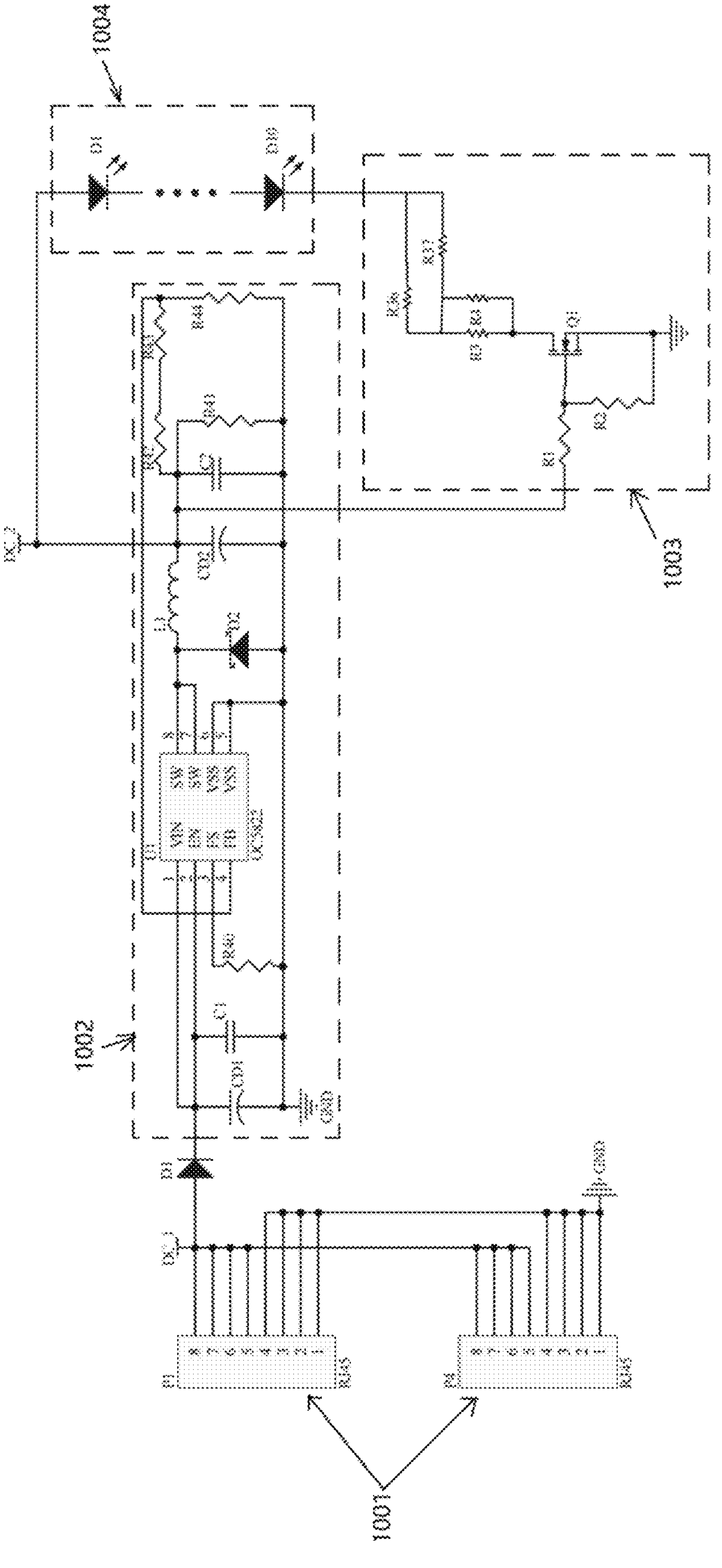
FIG. 10 is a schematic diagram of an embodiment of a non-dimmable quick link light capable of being powered at constant voltage, according to the present disclosure.

As shown in FIG. 10, it is a schematic diagram of an embodiment of a non-dimmable quick link light capable of being powered by constant voltage according to the present disclosure. Constant voltage DC_1 enters the quick link light through a twisted-pair cable connector 1001, flows through a rectifier diode D1 that prevents reverse connection of a line, and then enters a voltage conversion circuit 1002, to obtain an appropriate voltage DC_2. This is because after flowing through a relatively long twisted-pair cable, DC_1 may have voltage loss, which causes the voltage DC_1 entering each light to be not exactly the same. As a result, a difference exists in brightness of each light. Therefore, voltage DC_2 that is exactly the same for each light can be obtained through the voltage conversion circuit 1002. The voltage conversion circuit 1002 is a buck circuit in this embodiment. The dashed lines 1003 show an LED driving circuit of type 1. The LED driving circuit of type 1 is characterized by being non-dimmable, and 1004 is an LED array.

Figure 11:
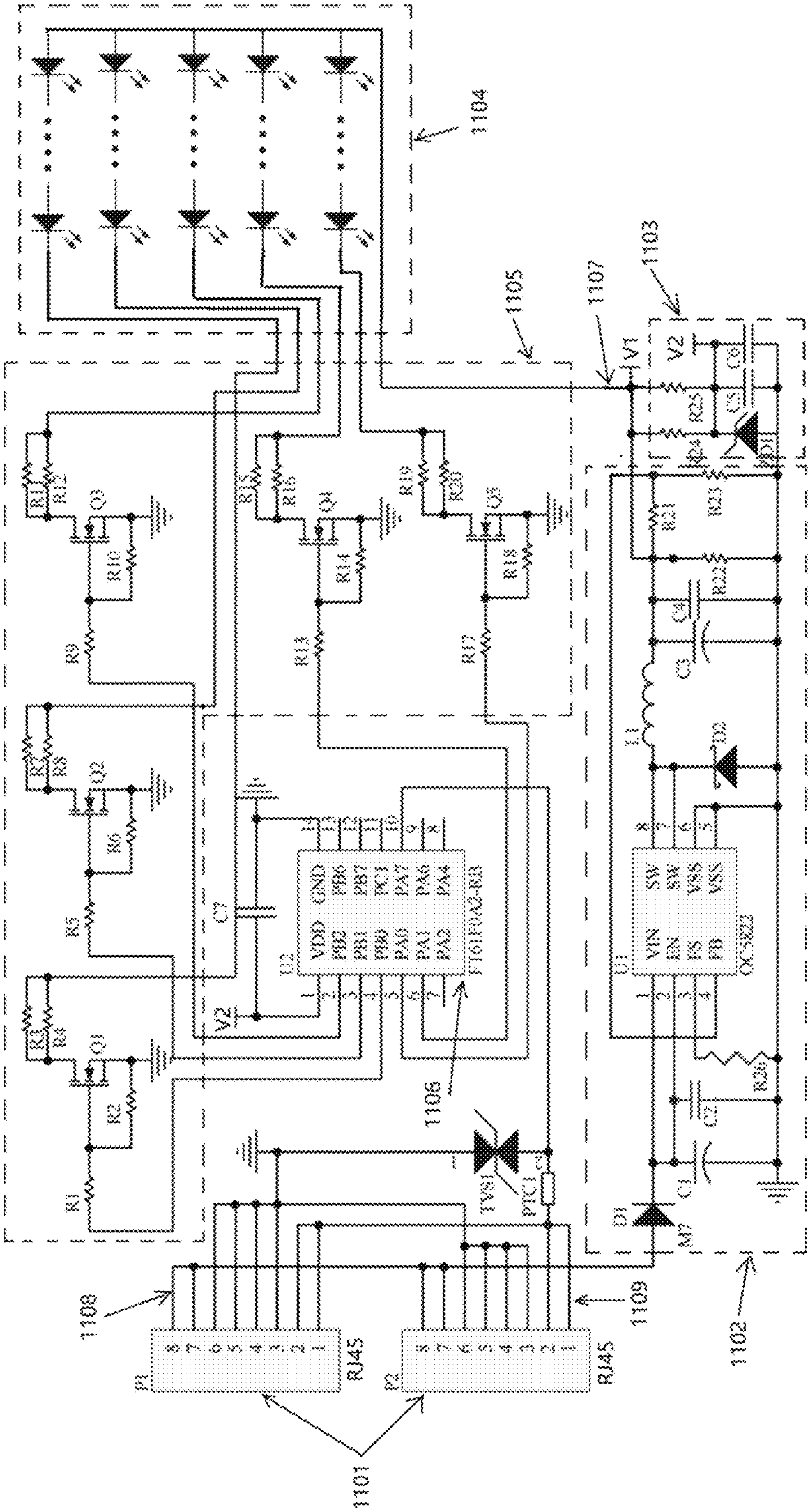
FIG. 11 is a schematic diagram of an embodiment of a dimmable quick link light capable of being powered at constant voltage according to the present disclosure.

As shown in FIG. 11, it is a schematic diagram of an embodiment of a dimmable quick link light capable of being powered by constant voltage according to the present disclosure. Input voltage 1108 and control information 1109 enter the quick link light from a twisted-pair cable connector 1101. The twisted-pair cable connector 1101 is an RJ45 socket in this embodiment. Another RJ45 socket is configured to cascade lights. The input voltage 1108 enters a voltage conversion circuit 1102, to obtain an operating voltage 1107 that is provided to an LED array. As the voltage 1108 may have a voltage drop after being transmitted through a twisted-pair cable, new voltage conversion needs to be performed to obtain voltage 1107 that is exactly the same for all lights in a system, ensuring that all the lights in the system have the same brightness. Part of current of the operating voltage 1107 flows into another voltage conversion circuit 1103, and a low voltage V2 is output to a micro-controller 1106. The dashed lines 1105 show a network that includes five LED driver circuits, which can drive five LED light strings, such as cool white light, warm white light, red light, blue light, and green light. In this embodiment, this driving circuit is a driving circuit of type 2. The driving circuit of type 2 is characterized in that the input driving signal is PWM, and output driving current is also in the form of PWM. A control signal 1109 enters the micro-controller 1106 for decoding through a positive temperature coefficient protection resistor PTC1. In this implementation, the control signal receiving circuit is a CMOS logic level circuit.

Figure 12:
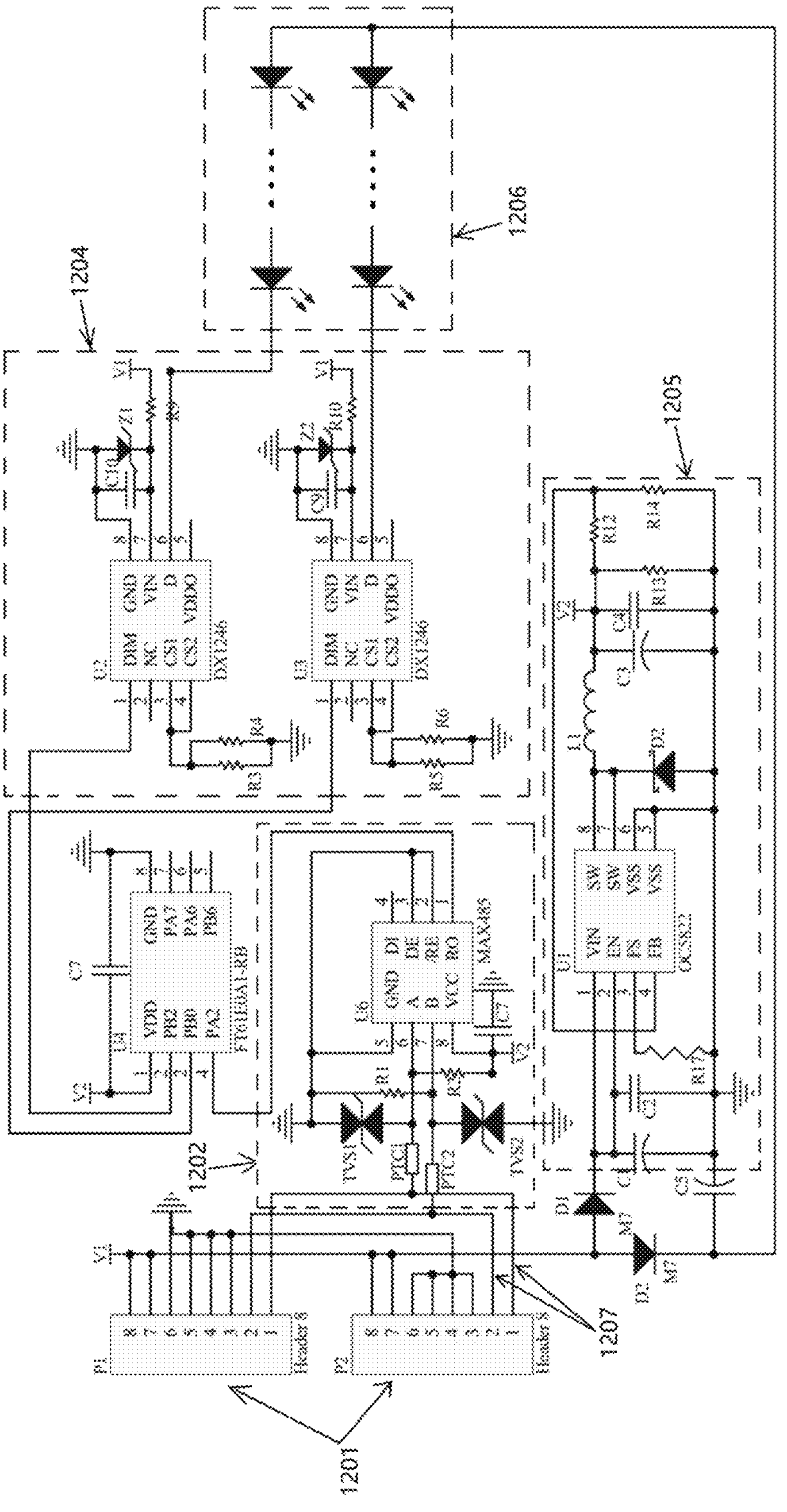
FIG. 12 is a schematic diagram of an embodiment of a non-dimmable quick link light capable of being powered at constant current according to the present disclosure.

As shown in FIG. 12, it is a schematic diagram of an embodiment of a non-dimmable quick link light capable of being powered by constant current according to the present disclosure, which is suitable for a quick link lighting system powered by an SADLCC power source. Constant current V1 from the SADLCC power source enters the quick link light through a twisted-pair cable connector 1201. Most of the constant current V1 flows directly to an LED array 1206, and a small part of the constant current V1 enters a voltage conversion circuit 1205. The voltage conversion circuit 1205 outputs an operating voltage V2 to a micro-controller 1203 and other digital circuits. Meanwhile, a control signal 1207 from the SADLCC power source also enters a light through a twisted-pair cable connector 1201. In this embodiment, a control signal receiving circuit is an RS485 differential signal interface circuit. An RS485 chip U6 converts a differential signal into a CMOS signal 1208 and transmits it to a micro-controller U4. The micro-controller U4 decodes the control signal and outputs a PWM dimming signal to a driving circuit 1204. In this embodiment, the driving circuit 1204 is an LED driving circuit of type 3, characterized in that the input driving signal is PWM or I2C, and continuous average analog current is output. The analog current output by the driving circuit 1204 is transmitted to the LED array 1206. The LED driving circuit can also be type 2 or type 3.

Figure 13:
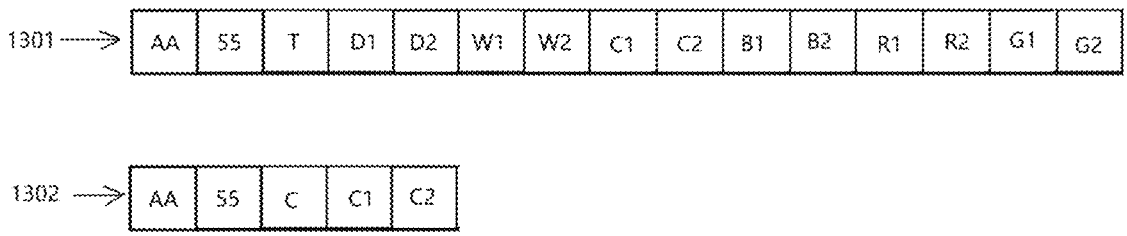
FIG. 13 is two formats of control information of a quick link light system according to the present disclosure.

As shown in FIG. 13, it defines two formats of control information of a quick link lighting system. The format 1301 show a long format including 15 bytes. Byte 1 represents character "AA"; byte 2 represents character "55". Byte 1 and byte 2 serve as header flag bytes of the control signal. Byte 3 represents the signal type byte. Byte 4 and Byte 5 are PWM cycle bytes. PWM cycles of all channels are the same. Byte 6 and Byte 7 represent a PWM duty cycle of channel 1 (color 1). Byte 8 and Byte 9 represent a PWM duty cycle of channel 2 (color 2). Byte 10 and Byte 11 represent a PWM duty cycle of channel 3 (color 3). Byte 12 and Byte 13 represent a PWM duty cycle of channel 4 (color 4). Byte 14 and Byte 15 represent a PWM duty cycle of channel 5 (color 5). The format 1302 show a short-format control information. Byte 1 represents character "AA", and byte 2 represents character "55". Byte 1 and Byte 2 are starting flag bytes of the control information. Byte 3 represent a channel (color) serial number, and byte 4 and byte 5 represent a PWM duty cycle of the channel.

Figure 14:
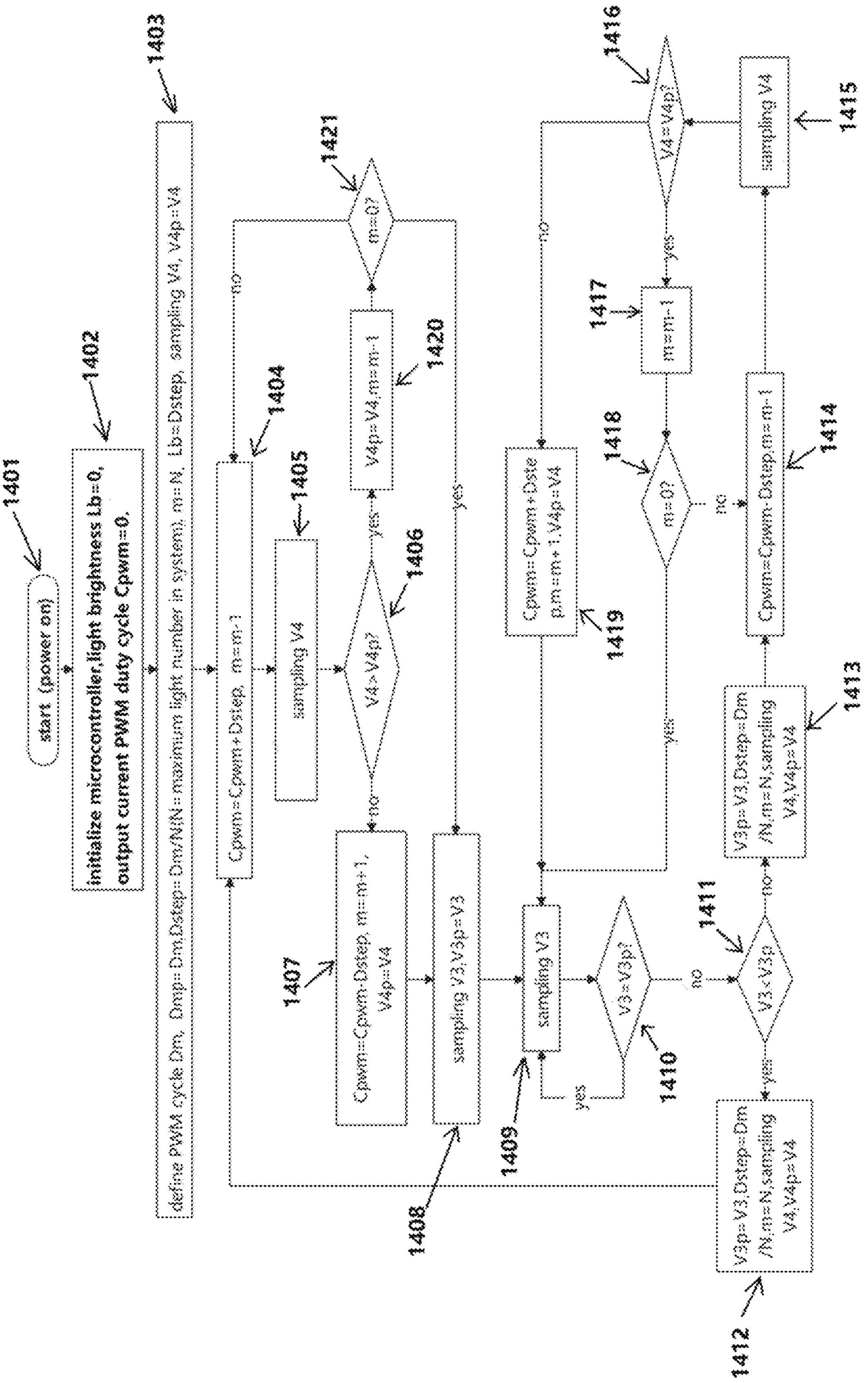
FIG. 14 is a flowchart of a software implementation algorithm of a micro-controller of a basic SADLCC power source based on FIG. 7A according to the present disclosure.

As shown in FIG. 14, it is a flowchart of an algorithm of a basic SADLCC power source based on the circuit in FIG. 7A, performed by the micro-controller U3 in FIG. 7A. After the micro-controller is powered on, the flow starts from a module 1401. The control flow goes to a function module 1402. The micro-controller U3 first transmits a brightness signal Lb to a quick link light. Variable 'Lb' represents the brightness of the light, and Lb is set to 0% (minimum brightness). The micro-controller U3 then transmits an output current control PWM signal to a constant-current generation circuit compatible with PWM dimming and analog dimming. Variable 'Cpwm' represents a duty cycle of the PWM signal transmitted to the constant-current generation circuit compatible with PWM dimming and analog dimming. Then, the control flow enters a function module 1403. The micro-controller U3 sets an appropriate maximum PWM duty cycle Dm and stores Dm in variable Dmp. Variable N represents a maximum number of lights in a system, and variable Dstep is endowed with a value equal to Dm divided by N; m is a counter variable; m is initialized to be equal to N; and Dstep is endowed with Lb and transmitted to the quick link light. That is, it is assumed there is only one light in the system. The micro-controller U3 samples voltage V4 that reflects a magnitude of the output current and stores the V4 value in variable V4*p*.

The control flow goes to a function module 1404. The micro-controller U3 controls the PWM duty cycle Cpwm of the output current to be increased by Dstep (adding one lamp), so that the output current increases, and the counter variable m decreases by 1. The control flow goes to a function module 1405. The micro-controller U3 samples voltage V4. The control flow then goes to a condition module 1406. If V4 increases (V4 is greater than V4*p*), it indicates that more lights are connected to the system. The control flow then goes to a function module 1420. A new V4 value is stored in variable V4*p*. The counter variable m decreases by 1. The control flow goes to a condition module 1421. If m is equal to 0, it indicates that the output current has reached its maximum value. The control flow then goes to a function module 1408. If m is not equal to 0, the control flow returns to the function module 1404. If V4 of the condition module 1406 is not greater than V4*p*, it indicates that the current output current has reached current required by all the lights in the system for operation. The control flow goes to a function module 1407, and the output current returns to the value of the previous step. The control flow then goes to a function module 1408.

In the function module 1408, the micro-controller U3 samples output voltage V3, then stores the value of V3 in variable V3*p*. The control flow then goes to a function module 1409. The micro-controller U3 samples the output voltage V3. The control flow then goes to a condition module 1410. If V3 is equal to V3*p*, it indicates that the number of the lights in the system does not change. The control flow then goes to a function module 1409. If V3 is not equal to V3*p*, it indicates that the number of the lights in the system changes. The control flow goes to a condition module 1411. If V3 is less than V3*p*, it indicates that a new light is connected to the system. The control flow goes to a function module 1412. A new V3 value is stored in V3*p*. The micro-controller U3 samples V4 and stores a new V4 value in V4*p*. The control flow then goes to a function module 1404. If V3 is greater than V3*p*, it indicates that some lights have been removed from the system. The control flow then goes to a function module 1413. A new V3 value is stored in variable V3*p*. The micro-controller U3 samples V4. A new V4 value is stored in variable V4*p*. The control flow goes to a function module 1414. The PWM duty cycle variable Cpwm of the output current is adjusted to be decreased by Dstep, so that the counter variable m is decreased by 1, and the output current is reduced. The control flow goes to a function module 1415. The micro-controller U3 samples V4, and the control flow then goes to a condition module 1416. If V4 is equal to V4*p*, it indicates that the output current is not less than the operating current of the lamp. The control flow goes to a function module 1417, and the counter variable m is decreased by 1. The control flow goes to a condition module 1418. If the variable m is greater than 0, the control flow goes to a function module 1414, otherwise, the control flow goes to a function module 1409. If V4 is not equal to V4*p* in the condition module 1416, it indicates that the output current is less than the operating current of the lamp. The control flow goes to the function module 1419. The PWM duty cycle Cpwm is increased by Dstep, the counter variable m is increased by 1, and a new V4 value is stored in variable V4*p*. The control flow then returns to the function module 1409.

Figure 15:
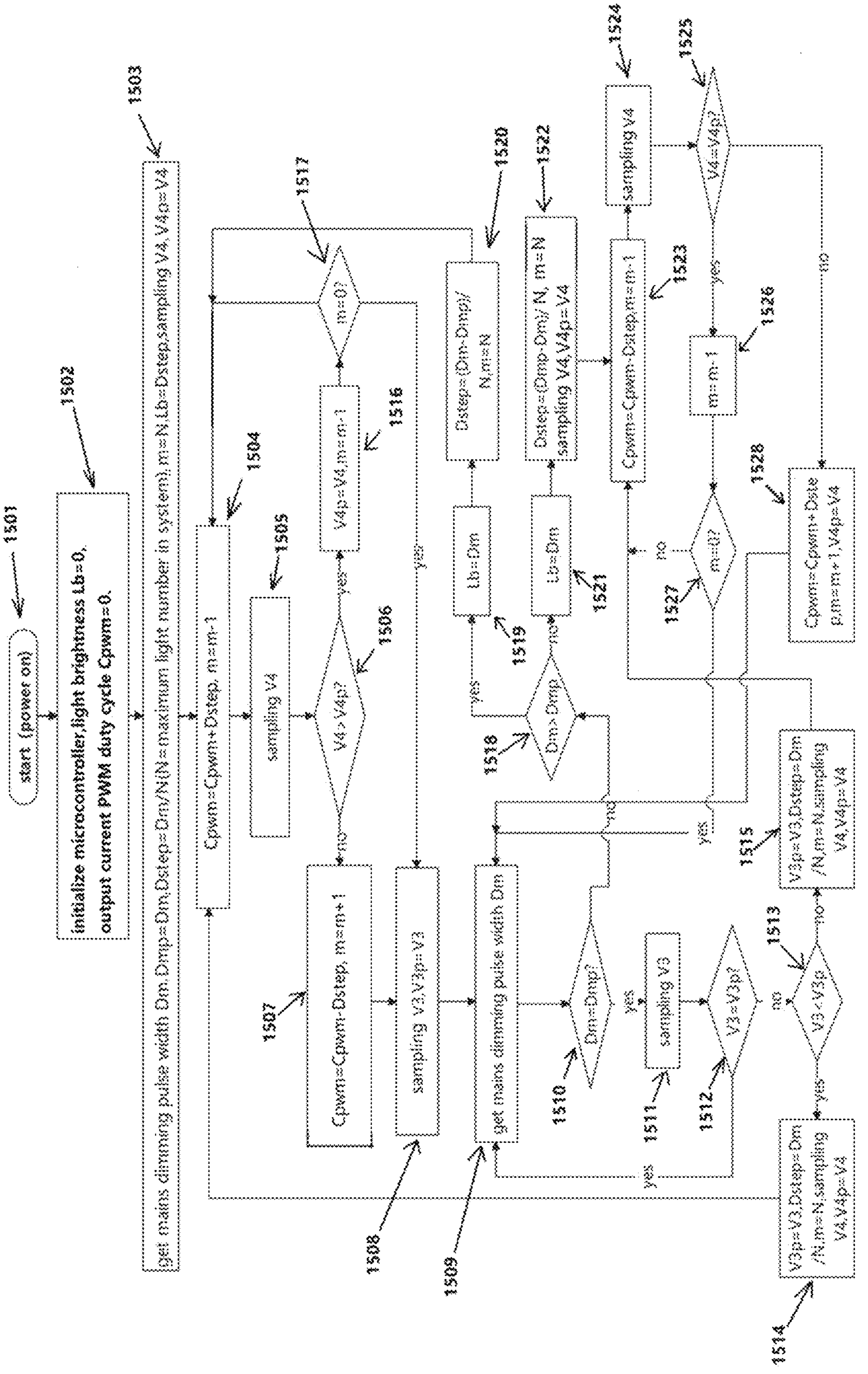
FIG. 15 is a flowchart of a program of a software implementation algorithm of a micro-controller software of an SADLCC power source compatible with a mains dimmer based on FIG. 7B according to the present disclosure.

As shown in FIG. 15, it is a flowchart of a software implementation algorithm of an SADLCC power supply compatible with a mains dimmer based on the circuit of FIG. 7B according to the present disclosure. The algorithm is run by the micro-controller U3 in the circuit of FIG. 7B. At block 1501, an algorithm starts to be run when a micro-controller is powered on. After the micro-controller is powered on, a step of a function module 1502 is first executed in the control flow. At the function module 1502, the micro-controller U3 first transmits a control instruction including variable Lb to a light. Variable Lb represents brightness of the light. The brightness of the lamp is initialized to 0. Variable Cpwm represents a PWM dimming signal duty cycle for adjusting output current. Cpwm is initialized to 0 and transmitted to a constant-current generation circuit compatible with PWM dimming and analog dimming. The control process goes to a function module 1503. At the function module 1503, the micro-controller U3 reads a dimming signal pulse width Dm of the current mains dimmer and stores Dm in variable Dmp. Assuming that N pieces of lights can be connected to a system at most, Dm is divided by N to obtain a proportion Dstep corresponding to each lamp; and m is a counter variable that is initialized to N. Value Dstep is endowed with the brightness variable Lb and transmitted to the lamp. Namely, assuming that there is only one lamp in the system, the micro-controller U3 samples a voltage signal V4 that reflects load current and stores V4 in variable V4*p*.

The control process continues to go to a function module 1504. The micro-controller adjusts the PWM signal duty cycle Cpwm of the output current to be increased by Dstep (i.e. the current of one lamp), and transmits Cpwm to the constant-current generation circuit compatible with PWM dimming and analog dimming. Meanwhile, the counter variable m is decreased by 1. The control process continues to go to a function module 1505. The micro-controller U3 samples the voltage signal V4 that reflects the load current. The control process continues to go to a condition module 1506. If V4>V4*p* (the load current increases), it indicates that there are more lamps in the system, and the control process goes to a function module 1516. A new V4 value is stored in V4*p*. The number of the lights and the counter variable m are decreased by 1, and the control process then goes to a condition module 1517. If m is equal to 0, the output current has reached its maximum value.

The control flow jumps to the function module 1508, otherwise, the control flow jumps back to module 1504. If the condition at the condition module 1506 is not true, it means that the output current exceeds the total operating current of the lamps that are currently connected to the system. The control flow jumps to the function module 1507, and the output current returns to the value of the previous cycle.

At the function module 1508, the micro-controller U3 samples the output voltage V3 and stores the V3 value in variable V3*p*. The control flow then continues to goes to a function module 1509. The micro-controller U3 reads in a pulse width Dm from a mains dimming detection circuit and compares Dm with the original Dm value stored in variable Dmp. The control flow then goes to a condition module 1510. If Dm is equal to Dmp, it indicates that no dimming action occurs. The control flow continues to go to a function module 1511. If Dm is not equal to Dmp, it indicates that a dimming action occurs. The control flow jumps to a condition module 1518. At the function module 1511, the micro-controller U3 samples the output voltage V3, and then the control flow goes to a condition module 1512. If the V3 value is equal to the original value V3*p*, it means that the number of the lights in the system does not change, and the control process returns to the function module 1509. If the V3 value is not equal to the original value V3*p*, the control flow jumps to a condition module 1513. If V3 is less than the original value V3*p*, it indicates that a new lamp is connected to the system. The control flow jumps to a function module 1514. A new V3 value is stored in variable V3*p*, and the new Dm value is divided by the maximum number of the lamps N to obtain a new current proportion corresponding to each light. The counter variable m returns to the maximum number N of the lights. U3 further needs to sample the voltage V4 that reflects the load current and store the V4 value to variable V4*p*. The control process jumps back to the function module 1504. If V3 is greater than V3*p*, it indicates that some lights have been removed from the system, and the control process jumps to the function module 1515.

At the condition module 1510, if Dm is not equal to Dmp, the control flow jumps to another condition module 1518. If Dm is greater than Dmp, it indicates that the dimmer has been raised, and the control flow jumps to the function module 1519. A new dimming pulse width value Dm is first endowed with the brightness variable Lb and transmitted to the lights. The control flow then goes to a function module 1520. A brightness increment of each light is equal to a value of Dm minus Dmp and then divided by the maximum number N of the lights. The control flow jumps back to the function module 1504.

At the condition module 1518, if Dm is less than Dmp, it indicates that the dimmer has been lowered, and the control flow jumps to a function module 1521. The new dimming pulse width value Dm is endowed with the brightness variable Lb and transmitted to the light. The control flow then goes to a function module 1522, and a brightness variable Dstep of each light is equal to Dmp minus Dm and then divided by the maximum number N of the lights. The control flow then jumps to a function module 1523. The PWM dimming control signal Cpwm is decreased by Dstep and then transmitted to the constant-current generation circuit compatible with PWM dimming and analog dimming. The counter variable m is decreased by 1. The control flow then jumps to a function module 1524. The micro-controller U3 samples the voltage V4 that reflects the load current, and the control flow then goes to a condition module 1525. If V4 is equal to the original value V4*p*, it indicates that the output current is still greater than the operating current of all the lights in the current system. The control flow then continues to go to a function module 1526. The cycle counter variable m is decreased by 1. The control flow then goes to a condition module 1527. If m is equal to 0, it indicates that there are no lights in the system, and the control flow jumps to 1509. If m is greater than 0, the control flow jumps back to 1523. If V4 is not equal to the original value (less than the original value), it means that the output current has been equal to the operating current of all the lights in the system, and the control flow then jumps to a function module 1528. The PWM dimming signal Cpwm returns to the value of the previous step.

At the condition module 1513, if V3 is greater than V3p, it indicates that a light has been removed from the system. The control flow jumps to 1515. A new V3 value is stored to V3p. Then, the current Dm value is divided by the maximum number N of the lights to calculate a current percentage Dstep of each lamp at present. The counter variable m is re-initialized to N. The micro-controller U3 samples the voltage V4 that reflects the load current and stores V4 in V4p. The control flow jumps to the function module 1523.

As shown in FIG. 16, it is an outline diagram of the light according to the present disclosure, viewed in different viewing angles. Specifically, la stands for quick link light; 11a stands for twisted-pair cable connector; 2a stands for twisted-pair cable; and 21a stands for plug.

As shown in FIG. 17, it is an outline diagram after a twisted-pair cable of FIG. 16 is connected to the light.

It should be finally noted that the above describes only the preferred embodiments of the present disclosure and is not intended to limit the present disclosure. Although the present disclosure is described in detail with reference to the foregoing embodiments, a person skilled in the art may still make modifications to the technical solutions described in the foregoing respective embodiments or make equivalent replacements to partial technical features thereof. Any modification, equivalent replacement, improvement, and the like made within the spirit and principle of the present disclosure shall fall within the protection scope of the present disclosure.

What is claimed is:

1. A quick link light, provided with at least one external port for allowing one end of a twisted-pair cable to be connected, wherein each external port is a twisted-pair cable connector and is configured to obtain electric power required by the light for operation and/or obtain a control signal required by the light for operation and/or send a response signal;

wherein the light is a dimmable quick link light capable of being powered by constant voltage, and the dimmable quick link light capable of being powered by constant voltage comprises:

an LED array, configured to emit light;

at least one twisted-pair cable connector, configured to obtain electric power and a control signal from the twisted-pair cable; or at least two twisted-pair cable connectors, wherein any twisted-pair cable connector obtains the electric power and the control signal from the twisted-pair cable, and the remaining twisted-pair cable connectors are configured to cascade the electric power and the control signal between the lights;

a voltage conversion circuit, electrically connected to the twisted-pair cable connectors and configured to compensate a voltage drop in an electric power transmission process of the twisted-pair cable;

a dimmable LED driving circuit, connected to a control unit and the LED array and configured to receive a dimming signal and provide stable operating current for the LED array; and a control unit, configured to: receive the control signal from the twisted-pair cable and send the dimming signal to the dimmable LED driving circuit;

a quick link driving device, connected to the twisted-pair cable connector by a number of twisted-pair cables; and the quick link driving device comprises:

a constant-voltage power source, configured to: convert a mains supply input into constant-voltage current;

a quick link controller, configured to: generate a control signal for lights, and transmit the constant-voltage current from the constant-voltage power source to the lights, the quick link controller further comprises:

a signal transmitting and receiving module, configured to: receive a control signal and output a first control signal, wherein the signal transmitting and receiving module is a smart module or a wireless receiving module or an infrared receiving module, wherein the smart module is configured to: receive the control signal from a smart device and output the first control signal; the wireless receiving module is configured to: receive the control signal from a wireless remote controller and output the first control signal; the infrared receiving module is configured to: receive the control signal from an infrared remote controller and output the first control signal;

a micro-controller, configured to: receive the first control signal output by the signal transmitting and receiving module, decode the first control signal, and output a second control signal; and a control signal driving circuit, configured to: receive the second control signal output by the micro-controller, enhance the second control signal, and output the enhanced second control signal to the connection port; and a voltage conversion circuit, configured to: obtain a small part of the constant voltage current form the input port, and convert the current into proper operating voltage for the micro-controller and the smart module or wireless module or infrared module to work.

2. A quick link light, provided with at least one external port for allowing one end of a twisted-pair cable to be connected, wherein each external port is a twisted-pair cable connector and is configured to obtain electric power required by the light for operation and/or obtain a control signal required by the light for operation and/or send a response signal;

wherein the light is a dimmable quick link light capable of being powered by constant current, and the dimmable quick link light capable of being powered by constant current comprises:

an LED array, configured to emit light;

at least one twisted-pair cable connector, configured to obtain electric power and a control signal from the twisted-pair cable, or at least two twisted-pair cable connectors, wherein any twisted-pair cable connector obtains the electric power and the control signal from the twisted-pair cable, and the remaining twisted-pair cable connectors are configured to cascade the electric power and the control signal between the lights;

a dimmable LED driving circuit, connected to a control unit and the LED array respectively and configured to receive a dimming signal and provide stable operating current for the LED array; and a control unit, configured to: receive the control signal from the twisted-pair cable and send the dimming signal to the dimmable LED driving circuit;

a quick link driving device, connected to the twisted-pair cable connector by a number of twisted-pair cables; and the quick link driving device comprises:

a self-adaptive dynamic load constant-current power source, wherein the self-adaptive dynamic load constant-current power source is a self-adaptive dynamic load constant-current power source compatible to mains dimmer that supports to preset a color temperature, the self-adaptive dynamic load constant-current power source compatible to mains dimmer that supports to preset a color temperature comprises:

a constant-current generation circuit with PWM dimming and analog dimming, configured to convert a mains supply input into constant current output through the connection port;

an output current detection circuit, configured to convert output current into a third voltage signal that is suitable for being detected by a micro-controller;

an output voltage detection circuit, configured to convert output voltage into a fourth voltage signal that is suitable for being detected by a micro-controller;

the micro-controller, configured to: transmit a light control signal, detect the third voltage signal and the fourth voltage signal, calculate the number of lights that are currently connected to the basic self-adaptive dynamic load constant-current power source, and generate an adjustment signal, provide the adjustment signal to the constant-current power generation circuit with PWM dimming and analog dimming, change a magnitude of the output constant current, and enable the output constant current to match the number of the lights that are currently connected;

a control signal driving circuit, configured to: receive the control signal output by the micro-controller, enhance the control signal, and output the enhanced control signal to the connection port; and a voltage conversion circuit, configured to: provides a proper voltage required for operations of the micro-controller and the control signal driving circuit;

a mains dimming detection circuit, configured to provide, for the mains dimmer, holding current required by switching on and further configured to: convert a phase-cut dimming signal output by the mains dimmer into a PWM duty cycle signal and provide the PWM duty cycle signal to the micro-controller for processing; the micro-controller transmits the corresponding control signal to the control signal driving circuit according to the PWM duty cycle signal, and transmits a corresponding dimming signal to the constant-current power generation circuit with PWM dimming and analog dimming; and a magnitude of current output by the self-adaptive dynamic load constant-current power source compatible with the mains dimmer is determined jointly according to the number of the currently connected lights and an output signal of the dimmer;

a manual switching and resistance detection circuit, configured to: perform switching to resistors with different resistance values through a manual switch, wherein each resistance value represents a color temperature; and when powered on, the micro-controller first reads the resistance value through analog-digital conversion and outputs color temperature presetting control information according to the resistance value.

3. A quick link driving device, wherein the quick link driving device is provided with at least one connection port for allowing one end of a twisted-pair cable to be connected;

the connection port is a twisted-pair cable connector or a twisted-pair cable hub, configured to output electric power required by the quick link light for operation and/or a control signal required by the quick link light for operation and/or configured to input a response signal transmitted by the quick link light; comprising a constant-voltage power source and a quick link controller, wherein the external constant-voltage power source and quick link controller comprises:

a constant-voltage power source, configured to: convert a mains supply input into constant-voltage current;

a quick link controller, configured to: generate a control signal for lights, and transmit the constant-voltage current from the constant-voltage power source to the lights, the quick link controller further comprises:

a signal transmitting and receiving module, configured to: receive a control signal and output a first control signal, wherein the signal transmitting and receiving module is a smart module or a wireless receiving module or an infrared receiving module, wherein the smart module is configured to: receive the control signal from a smart device and output the first control signal; the wireless receiving module is configured to: receive the control signal from a wireless remote controller and output the first control signal; the infrared receiving module is configured to: receive the control signal from an infrared remote controller and output the first control signal;

a micro-controller, configured to: receive the first control signal output by the signal transmitting and receiving module, decode the first control signal, and output a second control signal; and a control signal driving circuit, configured to: receive the second control signal output by the micro-controller, enhance the second control signal, and output the enhanced second control signal to the connection port; and a voltage conversion circuit, configured to: obtain a small part of the constant voltage current form the input port, and convert the current into proper operating voltage for the micro-controller and the smart module or wireless module or infrared module to work.

4. A quick link driving device, wherein the quick link driving device is provided with at least one connection port for allowing one end of a twisted-pair cable to be connected; the connection port is a twisted-pair cable connector or a twisted-pair cable hub, configured to output electric power required by the quick link light for operation and/or a control signal required by the quick link light for operation and/or configured to input a response signal transmitted by the quick link light; comprising a self-adaptive dynamic load constant-current power source, wherein the self-adaptive dynamic load constant-current power source is a basic self-adaptive dynamic load constant-current power source, the basic self-adaptive dynamic load constant-current power source comprises:

a constant-current generation circuit with PWM dimming and analog dimming, configured to convert a mains supply input into constant current output through the connection port;

an output current detection circuit, configured to convert output current into a third voltage signal that is suitable for being detected by a micro-controller;

an output voltage detection circuit, configured to convert output voltage into a fourth voltage signal that is suitable for being detected by a micro-controller;

the micro-controller, configured to: transmit a light control signal, detect the third voltage signal and the fourth voltage signal, calculate the number of lights that are currently connected to the basic self-adaptive dynamic load constant-current power source, and generate an adjustment signal, provide the adjustment signal to the constant-current power generation circuit with PWM dimming and analog dimming, change a magnitude of the output constant current, and enable the output constant current to match the number of the lights that are currently connected;

a control signal driving circuit, configured to: receive the control signal output by the micro-controller, enhance the control signal, and output the enhanced control signal to the connection port; and a voltage conversion circuit, configured to: provides a proper voltage required for operations of the micro-controller and the control signal driving circuit.

5. The quick link driving device according to claim 4, wherein the self-adaptive dynamic load constant-current power source is a self-adaptive dynamic load constant-current power source compatible with a mains dimmer; and the self-adaptive dynamic load constant-current power source compatible with a mains dimmer comprises:

a basic self-adaptive dynamic load constant-current power source circuit, configured to:

automatically detect a number of lights that are currently connected to the self-adaptive dynamic load constant-current power source compatible with the mains dimmer, and output constant current adapted to the currently connected lights; and a mains dimming detection circuit, configured to provide, for the mains dimmer, holding current required by switching on and further configured to: convert a phase-cut dimming signal output by the mains dimmer into a PWM duty cycle signal and provide the PWM duty cycle signal to the micro-controller for processing; the micro-controller transmits the corresponding control signal to the control signal driving circuit according to the PWM duty cycle signal, and transmits a corresponding dimming signal to the constant-current power generation circuit with PWM dimming and analog dimming; and a magnitude of current output by the self-adaptive dynamic load constant-current power source compatible with the mains dimmer is determined jointly according to the number of the currently connected lights and an output signal of the dimmer.

6. The quick link driving device according to claim 5, wherein the self-adaptive dynamic load constant-current power source compatible with a mains dimmer is a self-adaptive dynamic load constant-current power source compatible with a mains dimmer that supports using a switch to switch a color temperature, and the self-adaptive dynamic load constant-current power source that supports using a switch to switch the color temperature and is compatible with the mains dimmer comprises:

the self-adaptive dynamic load power source compatible with the mains dimmer, configured to: automatically detect a number of lights that are currently connected into the self-adaptive dynamic load constant-current power source that supports using a switch to switch the color temperature and is compatible with the mains dimmer, and output current with an appropriate magnitude in conjunction with an output signal of the dimmer; and a mains supply on/off-state detection circuit, configured to: detect an on/off state of the mains supply and provide the on/off state to the micro-controller for processing, wherein the micro-controller outputs a color temperature switching control signal according to a change of the on/off state.

7. The quick link driving device according to claim 5, wherein the self-adaptive dynamic load constant-current power source compatible with a mains dimmer is a self-adaptive dynamic load constant-current power source compatible with a mains dimmer that supports to preset a color temperature, and the self-adaptive dynamic load constant-current power source supply that supports using a switch to preset the color temperature and is compatible with the mains dimmer comprises:

the self-adaptive dynamic load power source compatible with the mains dimmer, configured to: automatically detect a number of lights that are currently connected into the self-adaptive dynamic load constant-current power source that supports using a switch to switch the color temperature and is compatible with the mains dimmer, and output current with an appropriate magnitude in conjunction with an output signal of the dimmer; and a manual switching and resistance detection circuit, configured to: perform switching to resistors with different resistance values through a manual switch, wherein each resistance value represents a color temperature; and when powered on, the micro-controller first reads the resistance value through analog-digital conversion and outputs color temperature presetting control information according to the resistance value.

8. The quick link driving device according to claim 4, wherein the self-adaptive dynamic load constant-current power source is a self-adaptive dynamic load constant-current power supply that supports a 0-10V dimmer, and the self-adaptive dynamic load constant-current power source that supports the 0-10V dimmer comprises:

a basic self-adaptive dynamic load constant-current power source circuit, configured to: automatically detect a number of lights that are currently connected to the self-adaptive dynamic load constant-current power source compatible with the 0-10V dimmer, and output constant-current adapted to the currently connected lights;

a 0-10V dimming signal conversion circuit, configured to convert 0-10V dimming voltage into a PWM duty cycle ratio signal, transmit the PWM duty cycle signal to the micro-controller for processing; the micro-controller transmits the corresponding control signal to the control signal driving circuit according to the PWM duty cycle signal, and transmits a corresponding dimming signal to the constant-current power generation circuit with PWM dimming and analog dimming; and a magnitude of current output by the self-adaptive dynamic load constant-current power source that supports the 0-10V dimmer is determined jointly according to the number of the lights that are currently connected into the self-adaptive dynamic load constant-current power source that supports the 0-10V dimmer and an output signal of the dimmer.

* * * * *